US005796988A

United States Patent [19]
Naidu et al.

[11] Patent Number: 5,796,988
[45] Date of Patent: *Aug. 18, 1998

[54] METHOD AND SYSTEM USING DEDICATED LOCATION TO SHARE INFORMATION BETWEEN REAL MODE AND PROTECTED MODE DRIVERS

[75] Inventors: Harish Naidu; William G. Parry, both of Redmond, Wash.

[73] Assignee: Microsoft Corporation, Redmond, Wash.

[ * ] Notice: The term of this patent shall not extend beyond the expiration date of Pat. No. 5,604,887.

[21] Appl. No.: 746,717

[22] Filed: Nov. 15, 1996

Related U.S. Application Data

[63] Continuation of Ser. No. 184,668, Jan. 21, 1994, Pat. No. 5,604,887.

[51] Int. Cl.$^6$ ............................................. G06F 13/10
[52] U.S. Cl. ...................... 395/500; 395/681; 395/828; 395/829
[58] Field of Search ............................... 395/500, 400, 395/700, 652, 681, 821; 364/200

[56] References Cited

U.S. PATENT DOCUMENTS

| | | | |
|---|---|---|---|
| 4,799,145 | 1/1989 | Goss et al. | 364/200 |
| 4,858,114 | 8/1989 | Heath et al. | 364/200 |
| 4,928,237 | 5/1990 | Bealkowski et al. | 364/200 |
| 5,193,161 | 3/1993 | Bealkowski et al. | 395/400 |
| 5,291,585 | 3/1994 | Sato et al. | 395/500 |
| 5,307,491 | 4/1994 | Feriozi et al. | 395/700 |
| 5,386,524 | 1/1995 | Lary et al. | 395/400 |
| 5,459,867 | 10/1995 | Adams et al. | 395/700 |
| 5,481,709 | 1/1996 | Bealkowski et al. | 395/700 |
| 5,561,788 | 10/1996 | Letwin | 395/500 |
| 5,586,324 | 12/1996 | Sato et al. | 395/652 |

OTHER PUBLICATIONS

Hummel, Robert L., "PC Magazine Programmer's Technical Reference: The Processor and Coprocessor," PC® Magazine, 1992, pp. 85–105.

*Primary Examiner*—Kevin J. Teska
*Assistant Examiner*—Russell W. Frejd
*Attorney, Agent, or Firm*—Jones & Askew, LLP

[57] ABSTRACT

A computer method and system for providing protected mode device drivers that are compatible with real mode device drivers. A first aspect of the invention provides consistent assignment of drive unit numbers with which the same physical disks are accessed by the real mode and protected mode physical disk drivers. A second aspect of the invention provides consistent assignment of volume unit numbers with which the same logical volumes are accessed by real mode and protected mode logical volume drivers. A third aspect of the invention provides consistent assignment of adapter numbers with which the same adapters are controlled by real mode and protected mode adapter drivers and mapping real mode adapter driver requests to protected mode adapter driver requests of the protected mode adapter drivers that control the same adapters. A fourth aspect of the invention provides detection and protected mode accommodation of real mode functional drivers which are provided in addition to the real mode device drivers in the real mode operating system.

25 Claims, 25 Drawing Sheets

METHOD AND SYSTEM USING DEDICATED LOCATION TO SHARE INFORMATION BETWEEN REAL MODE AND PROTECTED MODE DRIVERS

CROSS-REFERENCE TO RELATED APPLICATION

This application is a continuation of U.S. patent application Ser. No. 08/184,668, filed Jan. 21, 1994, now U.S. Pat. No. 5,604,887.

TECHNICAL FIELD

The present invention relates to the field of device drivers and, more particularly, to an operating system which provides protected mode device drivers.

BACKGROUND OF THE INVENTION

A typical computer system includes a computer that is interfaced with a number of peripheral devices. The peripheral devices can be accessed by an operating system executing on the computer or by application programs executing on the computer via an appropriate interface. Such access to the devices is controlled by software programs known as device drivers. Many device drivers, such as those provided by the Microsoft MS-DOS operating system, are "real mode device drivers" which operate in a processor mode known as real mode. Real mode is the only mode of operation provided by the Intel 8086 microprocessor, on which the Microsoft MS-DOS operating system was originally designed to execute.

More recent microprocessors such as the Intel 80826, 80386 and 80486, sold by Intel Corporation of Cupertino, Calif., are upwardly compatible with the 8086 and thus are designed to support real mode but they may also operate in an enhanced mode, known as "protected mode". Protected mode provides benefits not provided by real mode. For instance, protected mode provides an enlarged virtual address space than provided by real mode. Protected mode also provides hardware support for multitasking and data security, which real mode does not. (The protection mechanism which provides data security in the 80386 and 80486 is described in pp. 101-133 of "Microsoft's 80386/80486 Programming Guide," published by Microsoft press, 1991.)

SUMMARY OF THE INVENTION

The present invention provides protected mode device drivers which are compatible with real mode device drivers that access the same device. The protected mode device drivers are compatible with the real mode device drivers in the sense that they use the same reference values to access the same devices. In a preferred embodiment, the invention provides an operating system capable of operating in protected mode and having the protected mode device drivers. During operation of the operating system in protected mode, the protected mode device drivers access the devices when so requested by the operating system or an application program. Real mode device drivers are also provided which access the devices in real mode when requested by an operating system or application program that requires real mode operation. The protected mode device drivers assign the same reference values to the devices as the real mode device drivers assign to the same devices. The invention ensures compatibility with respect to these reference values by providing multiple aspects of the invention, which are described below.

A first aspect of the invention provides consistent assignment of drive unit numbers with which the same physical disks are accessed by real mode and protected mode disk drivers. The real mode disk drivers which access physical disks may not assign the same drive unit numbers to those physical disks as the protected mode disk drivers which access the same physical disks. The problem is that real mode disk drivers may have different drive numbers than the drive numbers assigned to corresponding protected mode disk drivers for BIOS INT 13 h interrupts. In the first aspect of the invention, the preferred embodiment provides consistent assignment of the drive unit numbers with which the same physical disks are accessed via INT 13 h interrupts by both the real mode and protected mode physical disk drivers. As a result, access to the same physical disks is provided by both the real mode disk drivers and protected mode disk drivers in a compatible fashion.

A second aspect of the invention provides consistent assignment of logical volume unit numbers with which the same logical volumes are accessed by real mode and protected mode volume drivers. The real mode volume drivers which control access to logical volumes on disks may not assign the same volume unit numbers to those logical volumes as the protected mode volume drivers which control access to the same logical volumes. Specifically, the real mode volume drivers may have different volume numbers than the volume numbers assigned to corresponding protected mode volume drivers for BIOS INT 25 h interrupts. In the second aspect of the invention, the preferred embodiment provides consistent assignment of the volume unit numbers with which the same logical volumes are accessed via INT 25 h interrupts by both the real mode and protected mode logical volume drivers. Thus, access to the same logical volumes is provided by both the real mode volume drivers and protect mode volume drivers.

A third aspect of the invention provides consistent assignment of adapter numbers with which the same adapters are controlled by real mode and protected mode adapter drivers to access the peripheral devices connected to those adapters. The real mode adapter drivers which access peripheral devices via adapters may not assign the same adapter numbers to those adapters as the protected mode operating system assigns to protected mode adapter drivers that control the same adapters to access the same peripheral devices. In the third aspect of the invention, the preferred embodiment provides consistent assignment of the adapter numbers with which the same adapters are controlled by both the real mode and protected mode adapter drivers to access the same peripheral devices. The third aspect of the invention further provides mapping of requests to access the peripheral devices via real mode adapter drivers to requests to access the peripheral devices via protected mode adapter drivers which control the same adapters. Requests by application programs to access the peripheral devices may be directed to the real mode adapter drivers even during operation of the protected mode operating system unless otherwise directed. The preferred embodiment provides mapping of application program requests to access the peripheral devices via real mode adapter drivers to requests to access the peripheral devices via protected mode adapter drivers which control same adapters.

The preferred embodiment further provides protected mode operation of functions provided by real mode functional devices when the real mode device drivers are executed. Thus, a fourth aspect of the invention provides detection and protected mode accommodation of real mode functional drivers which have been provided in addition to the real mode device drivers. Real mode functional drivers may have been added to supplement the real mode device drivers by providing additional functions. These functions may or may not be provided by any protected mode functional drivers in the protected mode operating system. Unless these real mode functional drivers are accommodated by the operating system when operating in protected mode. the protected mode device drivers will be incompatible with the real mode device drivers. In the fourth aspect of the invention. the preferred embodiment provides detection and protected mode accommodation of the real mode functional drivers that are provided in addition to the real mode device drivers in the real mode operating system. As a result of providing the above four aspects of the invention, the preferred embodiment provides protected mode device drivers which are compatible with real mode device drivers and yet still reap the benefits of protected mode operation.

DETAILED DESCRIPTION OF THE INVENTION

The preferred embodiment of the present invention substitutes protected mode device drivers for real mode device drivers whenever possible. The protected mode device drivers are implemented to be compatible with the real mode device drivers. Specifically, the protected mode device drivers access devices are assigned reference values that identify the same devices in the same fashion as the real mode device drivers. The preferred embodiment further provides, to the extent possible, protected mode operation of functions provided by real mode functional devices when the real mode device drivers are executed.

The above features are provided by four separate aspects of the invention. described below. A first aspect of the invention provides consistent assignment of drive unit numbers with which the same physical disks are accessed by real mode and protected mode disk drivers. A second aspect of the invention provides consistent assignment of logical volume unit numbers with which the same logical volumes are accessed by real mode and protected mode volume drivers. A third aspect of the invention provides consistent assignment of adapter numbers with which the same adapters are controlled by real mode and protected mode adapter drivers to access the peripheral devices connected to those adapters. The third aspect of the invention further provides mapping of requests to access the peripheral devices via real mode adapter drivers to requests to access the peripheral devices via protected mode adapter drivers which control the same adapters. A fourth aspect of the invention provides detection and protected mode accommodation of real mode functional drivers which are provided in addition to the real mode device drivers.

Figure 1:
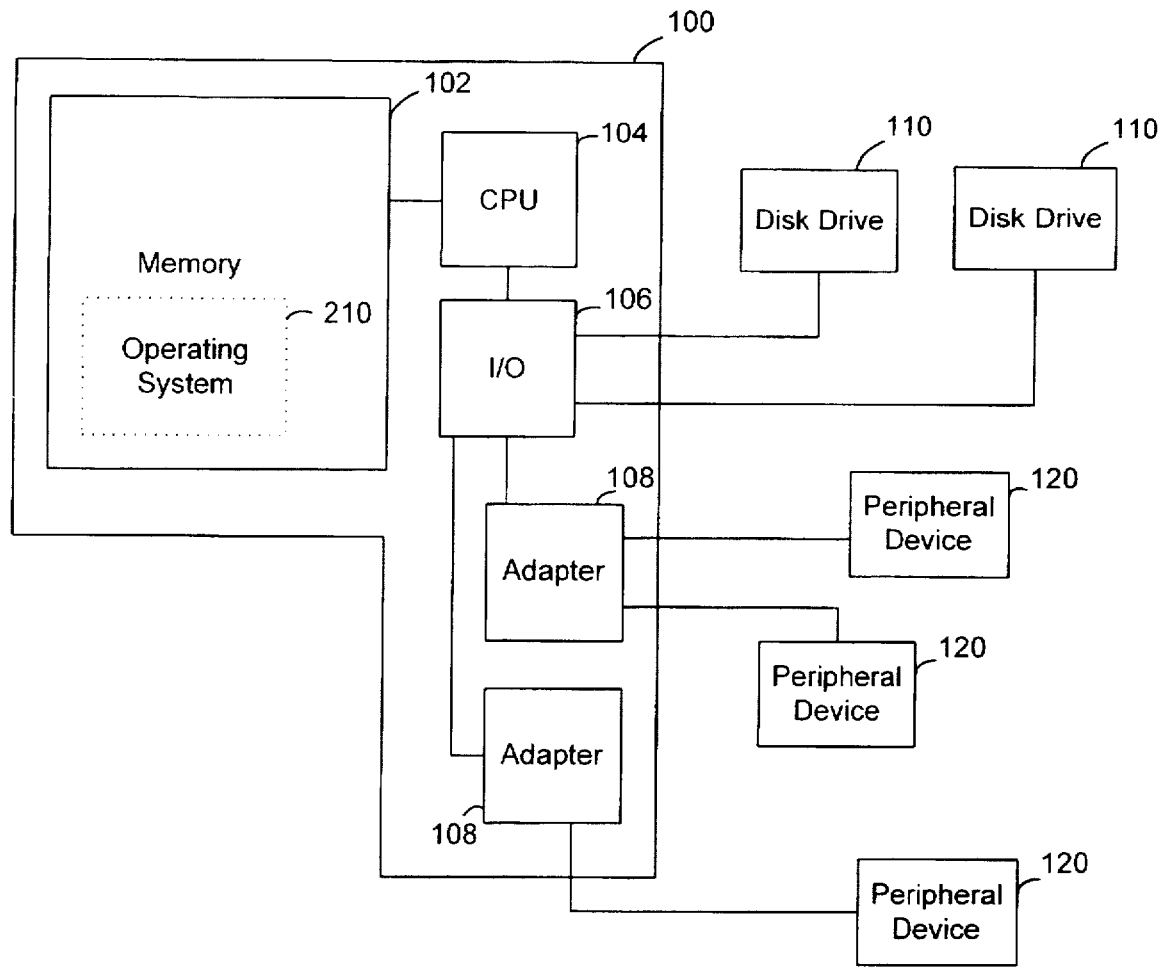
FIG. 1 is a block diagram of a typical computer system in which a computer is connected to disk drives and other peripheral devices.

A computer system suitable for practicing the preferred embodiment of the present invention is shown in FIG. 1. FIG. 1 is a block diagram of a computer system having a computer 100 coupled to disk drives 110 and peripheral devices 120. The computer 100 has an internal memory 102 which stores an operating system 210. The memory 102 also stores real mode and protected mode device drivers. These drivers may be part of the operating system 210 or separate from the operating system. The device drivers are run on a central processing unit (CPU) 104 to control access to the devices 110 and 120 as requested by the operating system 210 or by an application program. The device drivers include disk drivers and volume drivers which control the disk drives 110 via an I/O controller 106. The device drivers for the disks allow access to the physical disks and logical volumes on disks resident on the disk drives 110. The device drivers also include adapter drivers which control the adapters 108 through which the peripheral devices 120 are accessed. The memory 102 also stores real mode and protected mode functional drivers which are executed by the CPU 104 to add functional enhancements to the device drivers, such as encryption and data compression.

Figure 2:
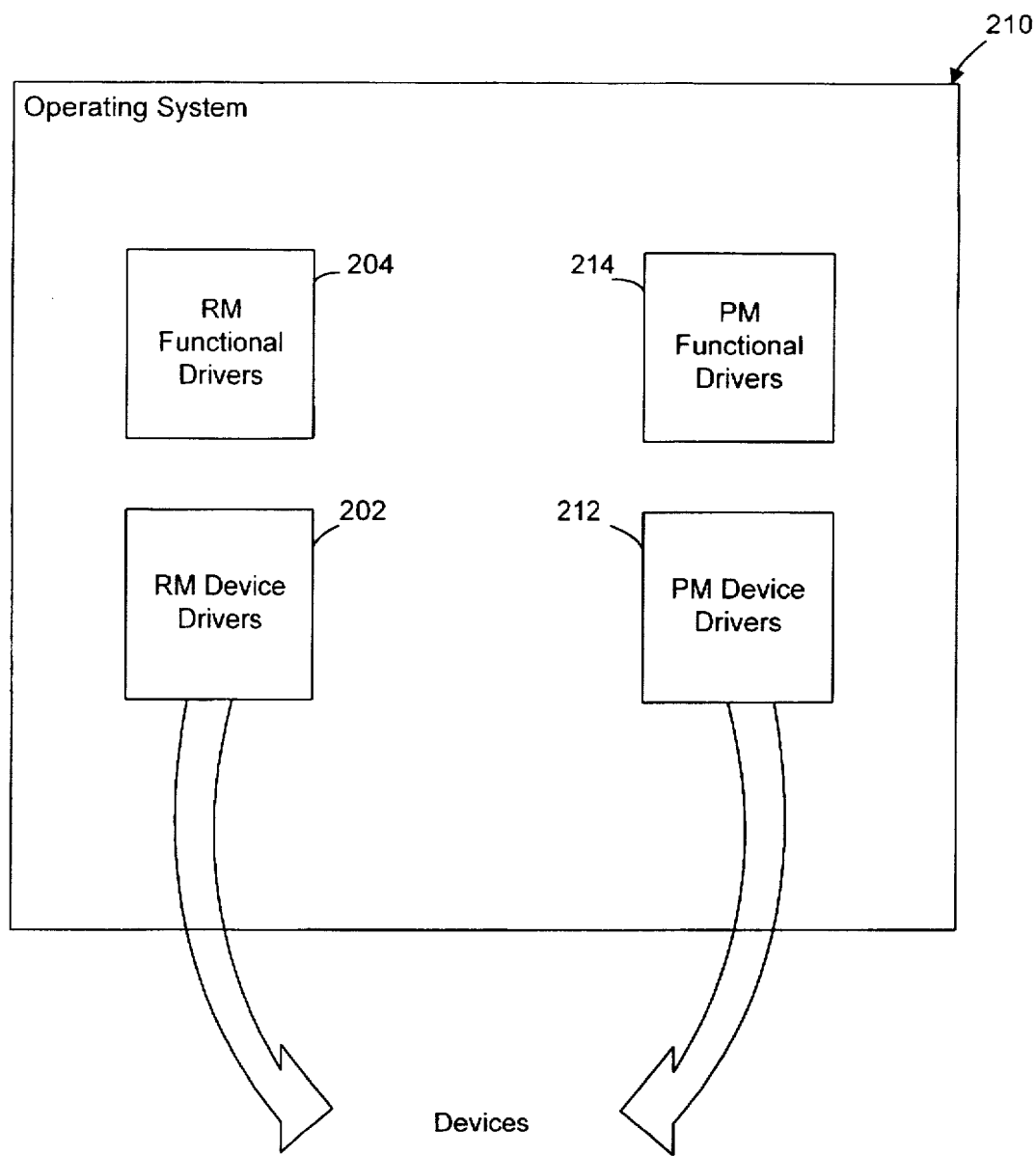
FIG. 2 is an illustration of the functional relationship among the real mode and protected mode device drivers and functional drivers and the devices which they control.

The functional relationship among the devices, device drivers and functional drivers in the preferred embodiment is illustrated in FIG. 2. The operating system 210 includes real mode (RM) device drivers 202 for the peripheral devices 120. The operating system 210 also includes protected mode (PM) device drivers 212 which control the same devices as the real mode device drivers 202. In the preferred embodiment, the operating system further includes real mode functional drivers 204 which supplement the real mode device drivers 202 and protected mode functional drivers 214 which supplement the protected mode device drivers 212. The functional drivers 204 may be part of the device drivers 202. In the preferred embodiment, the operating system 210 is composed of an embellished version of the Microsoft WINDOWS 3.1 operating system, sold by Microsoft Corporation of Redmond, Wash., provided on a platform of the Microsoft MS-DOS 5.0 operating system, also sold by Microsoft Corporation. The Microsoft MS-DOS operating system portion of the operating system 210 is loaded at boot time. The Microsoft WINDOWS operating system portion of the operating system 210 is loaded thereafter. Although the MS-DOS operating system portion of the operating system 210 is capable of executing only in real mode, the Microsoft WINDOWS operating system portion of the operating system 210 is capable of executing in either real mode or protected mode.

In the first aspect of the invention, the preferred embodiment provides consistency among the drive unit number mapping for hard disks by real mode device drivers 202 and the protected mode device drivers 212. When a physical sector of a disk is accessed by either the real mode device drivers 202 or the protected mode device drivers 212, the real mode device drivers 202 and the protected mode device drivers 212 must know the drive unit number of the disk drive to access the sector of the disk. The operating system 210, includes as part of the MS-DOS operating system a Basic Input/Output System software module (BIOS). The BIOS contains a set of predefined functions that may be called by operating systems or applications to perform tasks. The functions are called by software interrupts. One such interrupt is the INT 13 h ("h" designates hexadecimal) interrupt. Typically, a volume driver employs the INT 13 h interrupt to request the performance of various operations on a disk, that is identified by a drive unit number. The drive unit number is loaded into a processor register at the time of the interrupt.

Figure 3:
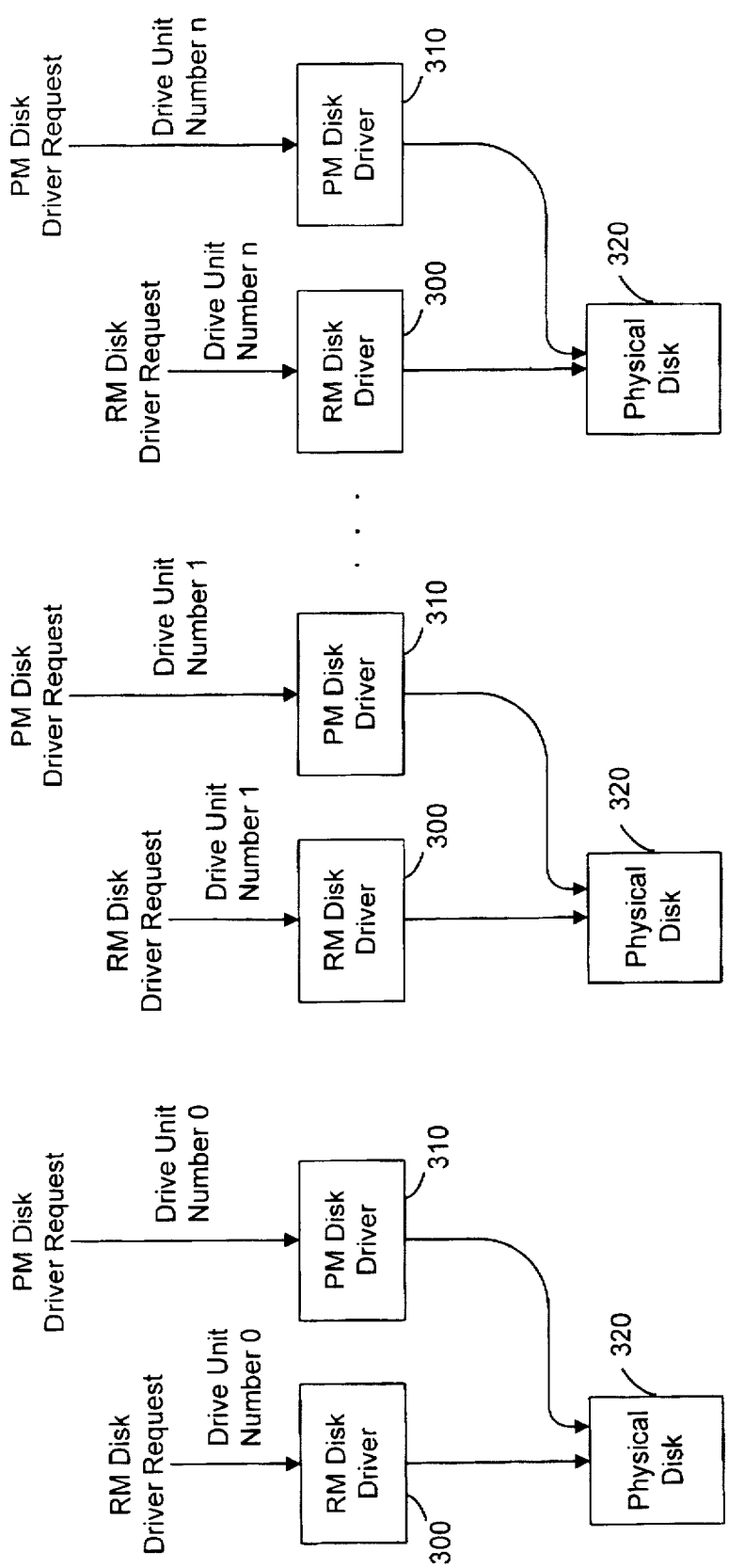
FIG. 3 is an illustration of the functional relationship among the real mode disk drivers and protected mode disk drivers of the preferred embodiment of the present invention.

In order for the protected mode disk drivers 310 (FIG. 3) to control access to the physical disks 320 in a fashion compatible with the real mode disk drivers 300, the protected mode disk drivers 310 must assign the same drive INT 13 h unit numbers as the real mode disk drivers 300 assign to the physical disks 320. That is, for example, the drive unit number 0 assigned to a first hard disk for a real mode disk driver 300 must also be assigned by the protected mode disk driver 310 for the hard disk, as is shown in FIG. 3. When the INT 13 h drive unit number 0 is specified in a request to access a physical disk, via the real mode disk driver 300 or the protected mode disk driver 310, the same disk 320 is accessed by either disk driver which has assigned the drive unit number 0 to the disk driver 110 that it controls.

Similarly, the similar parity of INT 13 h unit number assignments must exist for the rest of the hard disks 320. This is not ensured by simply assigning the INT 13 h drive unit numbers to the protected mode hard disk drivers 310 in the order that the protected mode hard disk drivers 310 are loaded because the protected mode hard disk drivers 310 do not necessarily load in the same order as the real mode hard disk drivers 300.

Figure 6:
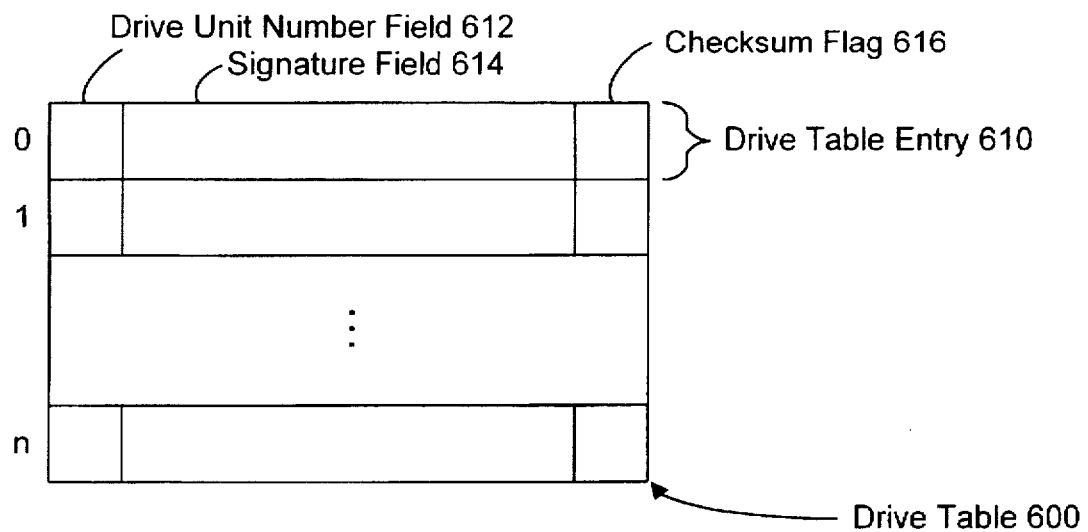
FIG. 6 is an illustration of the drive table created in the preferred embodiment.

To ensure consistent drive unit numbers, as explained above, the preferred embodiment first creates a drive table 600, which will be described in greater detail with reference to FIG. 6 below. The drive table 600 associates the drive unit number used by each real mode hard disk driver 300 with unique information stored on the physical hard disk accessed by that real mode hard disk driver 300. The protected mode hard disk drivers 310 then assign the drive unit numbers to the same physical hard disk 320 using the driver table. Each protected mode disk driver reads a selected portion of the physical disk to obtain the unique information and then extracts from the drive table the drive unit number that is associated with the unique information read from the physical hard disk. The extracted drive unit number is then assigned to the physical hard disk by the protected mode hard disk driver.

Figure 4:
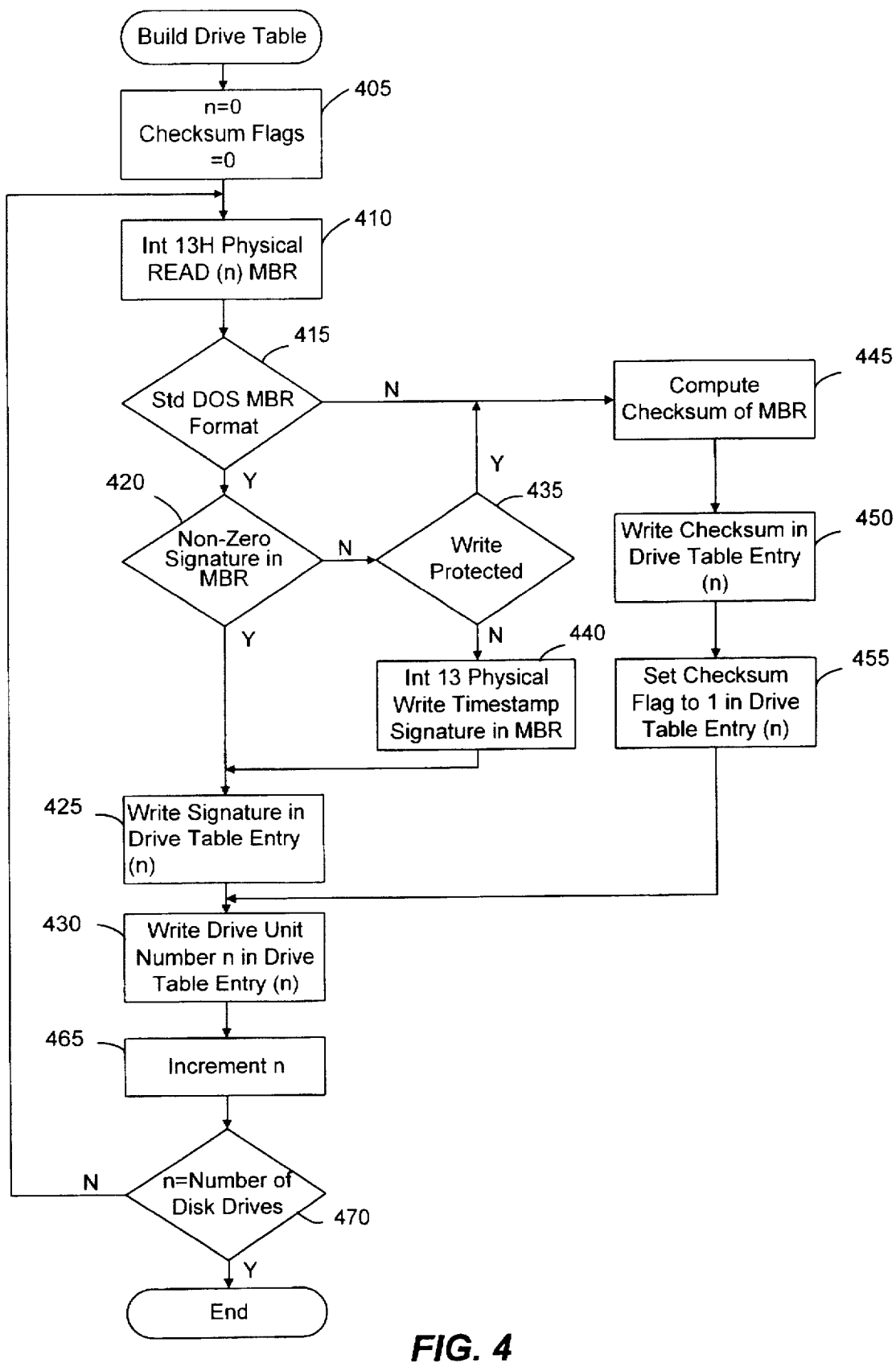
FIG. 4 is a flow diagram of the process of creating a drive table in the preferred embodiment.

FIG. 4 is a flow diagram of the process which creates the drive table described above, referred to herein as the Build Drive Table process. The Build Drive Table process can be implemented as software stored in the memory 102 and executed by the CPU 104 when the operating system 210 is loaded. In step 405, the Build Drive Table process initializes to 0 a disk drive counter n, and all checksum flags (described in more detail below) in the drive table, are also initialized to 0. In step 410, the Build Drive Table process initiates an INT 13 h interrupt to the CPU 104 to read a first physical hard disk 320. The Build Drive Table process provides the hard disk drive counter value n as the drive unit number (initially 0), a value which specifies that a read function is to be performed, and the sector number of the sector in which the master boot record is stored on the disk. In step 415, the Build Drive Table process determines whether the master boot record read in step 410 is of a standard format used by the MS-DOS operating system 200. If so, a location is provided on the hard disk in which a unique signature (which will be explained below) can be stored. The Build Drive Table process determines that the master boot record format is standard when byte DAh of the master boot record contains a value of zero. If the Build Drive Table process determines in step 415 that the master boot record read in step 410 is of the standard format, then control proceeds to step 420.

Figure 5:
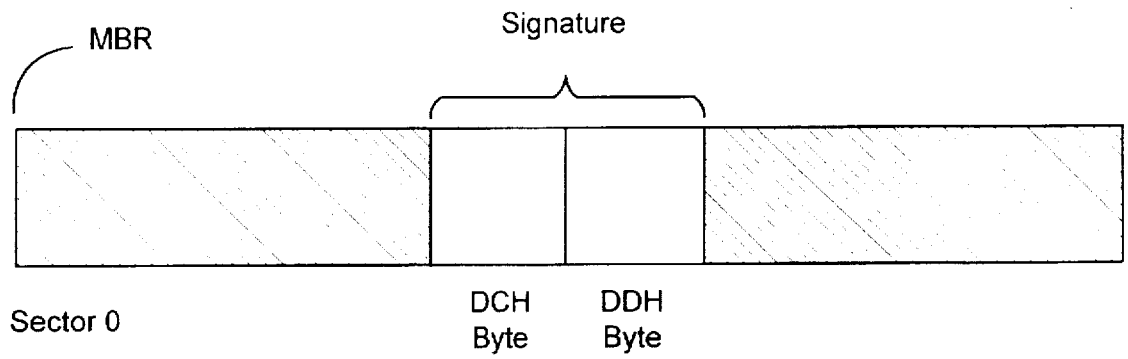
FIG. 5 is an illustration of the process of creating a drive table in the contents of a portion of a master boot record of a disk in the preferred embodiment.

In step 420, the Build Drive Table process determines whether the signature stored in a specific location of the master boot record has a non-zero value. FIG. 5 illustrates the master boot record (MBR) at sector 0 of the physical hard disk read in step 410, and the signature provided therein. The signature is provided at consecutive bytes DCh and DDh of sector 0. If the Build Drive Table process determines in step 420 that the signature in the master boot record is a non-zero value, control proceeds to step 425. In step 425, the signature stored in bytes DCh and DDh is written into an entry in a drive table. FIG. 6 illustrates the drive table into which the signature is written in step 425. In FIG. 6, the drive table 600 contains a drive table entry 610 for each disk drive 110. The drive table entry 610 contains a drive unit number field 612, a signature field 614 into which the signature was written in step 425, and a checksum flag 616. Control then proceeds to step 430. In step 430, the drive unit number n is written into the drive unit number field 612 of the same drive table entry 610 in which the signature was written into the signature field 614.

If the Build Drive Table process determines in step 420 that the signature in bytes DCh and DDh of the master boot record is 0, then control branches to step 435. In step 435, the Build Drive Table process determines whether the hard disk corresponding to the disk drive 110 is write-protected. If so, a new signature cannot be written onto the hard disk. If the Build Drive Table process determines in step 435 that the hard disk is not write-protected, then control proceeds to step 440. In step 440, the Build Drive Table process creates a new, unique signature and writes the new signature into bytes DCh and DDh of the master boot record.

If the Build Drive Table process determines in step 435 that the hard disk is write-protected, or if the Build Drive Table process determines in step 415 that the master boot record is not of the standard format, then control branches to step 445. In step 445 the Build Drive Table process computes a checksum of the contents of the first sector of the hard disk read in step 410. Control then proceeds to step 450 wherein the Build Drive Table process writes the computed checksum into the signature field 614 (FIG. 6) of the drive table entry 610 provided for the disk drive 110. In step 455 (FIG. 4), a checksum flag stored in the checksum flag field 616 of the drive table entry 610 for the hard disk 110 (and initialized to 0), is set to 1. Control then proceeds to step 430 in which, as explained above, the drive unit number n is written into the drive table 610 provided for the disk drive 110. Then, in step 465, the hard disk drive counter n is incremented. Control then proceeds to step 470, which determines whether all hard disk drives 110 have been processed. If not, the Build Drive Table process loops back to step 410. If so, the Build Drive Table process ends.

Figure 7:
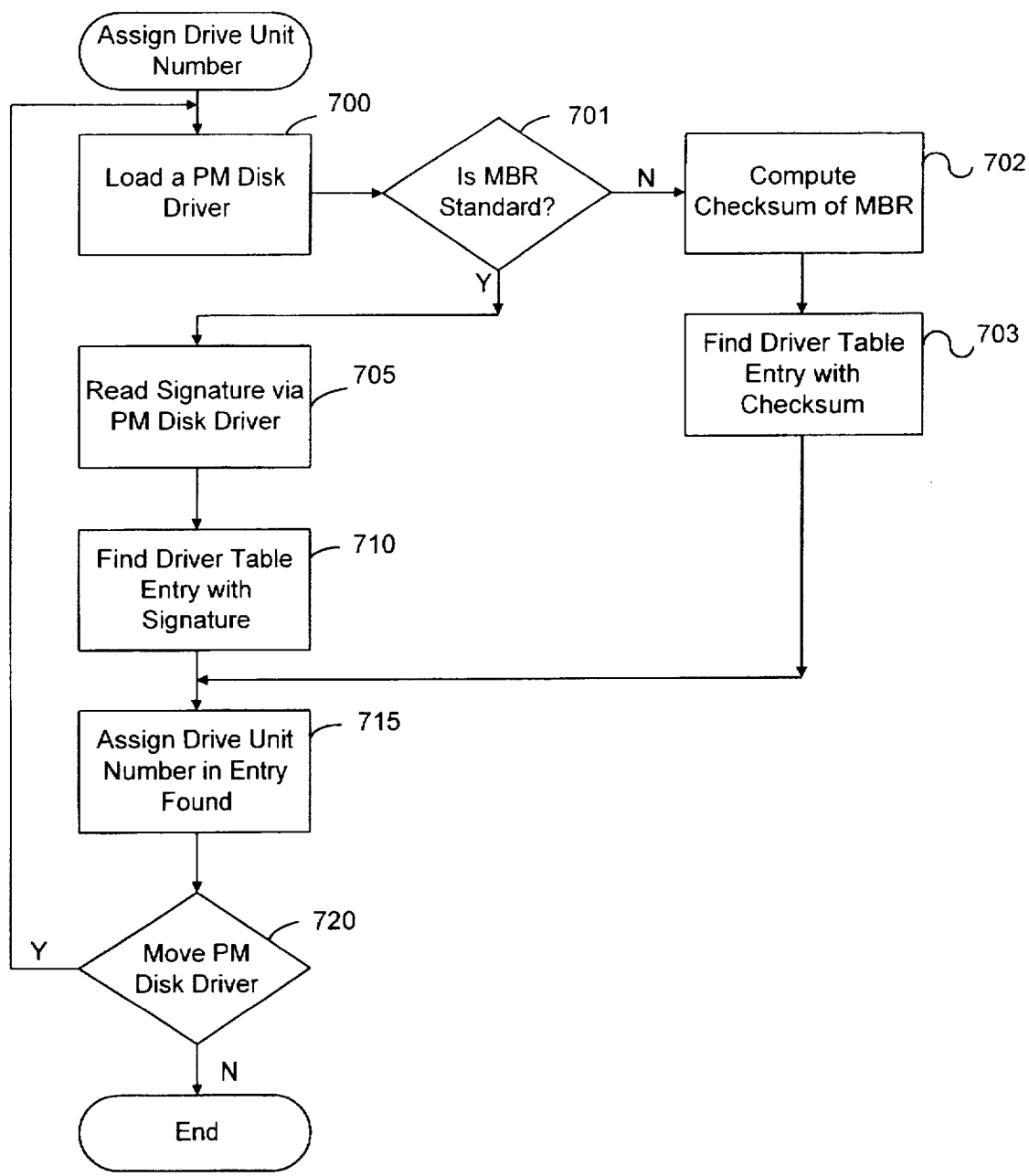
FIG. 7 is a flow diagram of the process of assigning a drive unit number in the preferred embodiment.

The drive table 600 created by the Build Drive Table process of FIG. 4 is then used to determine the correct drive unit number to be used by each of the protected mode disk drivers 310. FIG. 7 is a flow diagram of the process by which the protected mode disk drivers 310 assign the drive unit numbers to the physical hard disks, referred to herein as the Assign Drive Unit Number process. The Assign Drive Unit Number process can be implemented as software stored in the memory 102 and executed by the CPU 104 when the operating system 210 is loaded, during the loading of each protected mode disk driver 310 and after the Build Drive Table process has been performed.

In step 700 of the Assign Drive Unit Number process, a protected mode disk driver 310 is loaded. Control then proceeds to step 705. The process then determines whether the master boot record is standard or not (step 701). If the master boot record is not standard, a checksum of the master boot record is calculated (step 702). The resulting checksum is used as an index into the driver table to locate a driver entry table. In contrast, if the master boot record is standard, the Assign Drive Unit Number process reads the signature stored in bytes DCh and DDh of the master boot record of the physical hard disk (step 705). Control proceeds to step 710. In step 710, the Assign Drive Unit Number process finds the drive table entry 610 that has in the signature field 614 the signature read in step 705. Control then proceeds to step 715. In step 715, the drive unit number stored in the drive unit number field 612 of the drive table entry 610 found in step 710 is extracted, and the extracted drive unit number is assigned to the physical hard disk by the loaded protected mode disk driver 310. Control then proceeds to step 720, in which it is determined whether there are more protected mode disk drivers 310 to be loaded. If more protected mode disk drivers 310 are to be loaded, control loops back to step 700. Otherwise, the routine ends. As a result of the above process, the real mode disk drivers 300 and the protected mode disk drivers 310 which control the same hard disk drives 110 assign the same drive unit numbers to the same physical hard disks.

The second aspect of the invention will now be described. In the second aspect of the invention, the preferred embodiment provides consistency among the volume unit numbers for logical volumes that are used by the real mode device drivers 202 and the protected mode device drivers 212. A logical volume is all or a portion of a fixed storage medium such as a disk or tape. Each logical volume contains a self-sufficient file system containing at least one directory with zero or more files, and containing all the information required to locate these files and directories. The operating system 210 and application programs refer to a logical volume with a logical drive letter, such as "A:", "B:" when specifying a file or directory stored thereon. Although often a logical volume corresponds to a disk drive 110, a disk may contain more than one logical volume. When a logical volume is accessed by either the real mode device drivers 202 or the protected mode device drivers 212, the volume unit number (which corresponds to a logical drive letter) must be known in order to access the particular logical volume desired. The BIOS module, discussed above, provides an INT 25 h interrupt handler through which an operating system or application program requests the performance of a logical volume READ function which reads a specific logical volume on a disk. The BIOS module also provides an INT 26 h interrupt handler through which an operating system or application program may request a logical volume WRITE function which writes a specific logical volume on the hard disk. When an INT 25 h READ or INT 26 h WRITE is requested, the volume unit number must be specified to identify the specific logical volume to be read or to be written.

Figure 8:
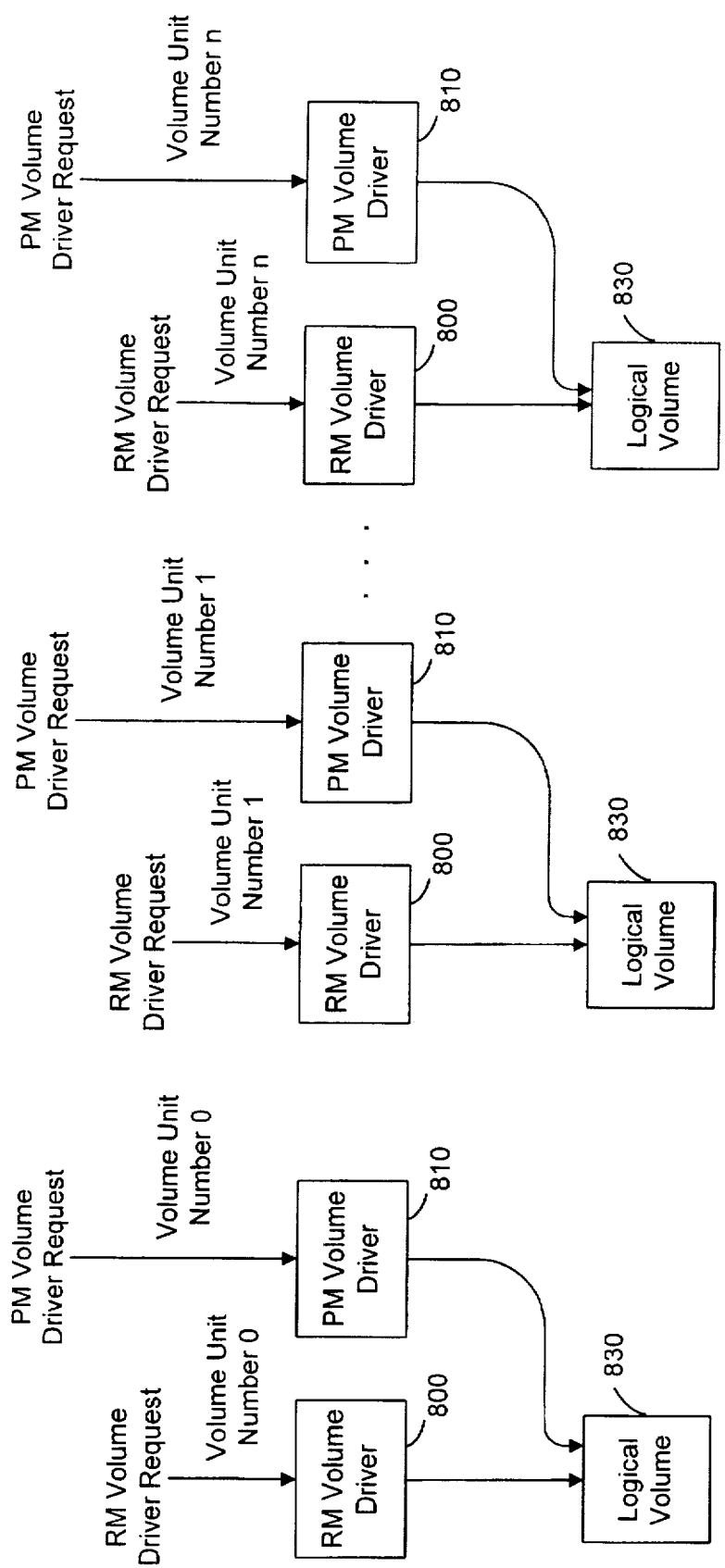
FIG. 8 is an illustration of the functional relationship among the real mode volume drivers and protected mode volume drivers of the preferred embodiment.

Like the drive unit numbers discussed above, the volume unit numbers are assigned to the logical volumes by real mode device drivers 202 which control access to the logical volumes (real mode volume drivers) in an order designated by the operating system (e.g., the MS-DOS operating system, by Microsoft Corp.). When the operating system 210 is loaded thereafter, protected mode volume drivers are loaded which assign the volume unit numbers to the same logical volumes which the protected mode volume drivers control. A block diagram illustrating this relationship is shown in FIG. 8. In order for the protected mode volume drivers 810 shown in FIG. 8 to be compatible with the real mode volume drivers 800, the protected mode volume drivers 810 must assign the same volume unit numbers as the real mode volume drivers 800 assigned to the same logical volumes 830. Thus, as shown in FIG. 8, volume unit number 0 is assigned to a first logical volume by the real mode volume driver 800 and by the protected mode volume driver 810 which access the first logical volume. Volume Unit Number 1 is assigned by the real mode volume driver 800 and by the protected mode volume driver 810 which access a next logical volume, and each subsequent logical volume is assigned a volume unit number of sequentially greater value, until the last volume unit number n is assigned.

Figure 11:
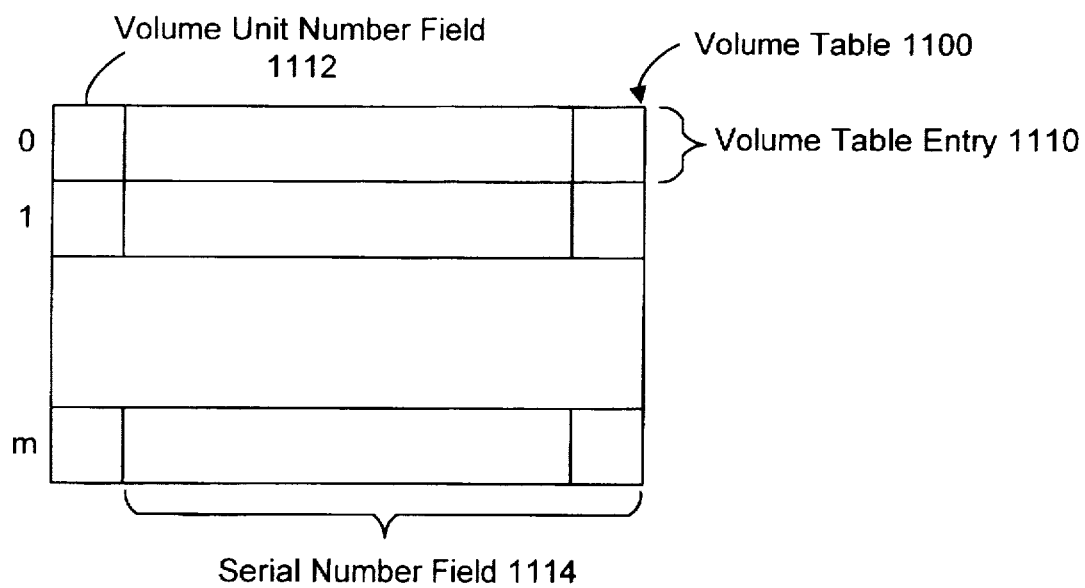
FIG. 11 is an illustration of the volume table created in the preferred embodiment.

To provide the consistent assignment of volume unit numbers described above, the preferred embodiment first creates a volume table 1100, which will be described in greater detail with reference to FIG. 11 below. The volume table associates the volume unit number assigned by each real mode volume driver 800 with a unique serial number stored in the logical volume 830 accessed by that real mode volume driver 800. The protected mode volume drivers 810 assign the volume unit numbers to the same logical volume 830 using the volume table. Each protected mode volume driver reads the unique serial number from the logical volume 830 via the protected mode volume driver and extracts from the volume table the volume unit number associated with the unique serial number read from the logical volume.

Figure 9:
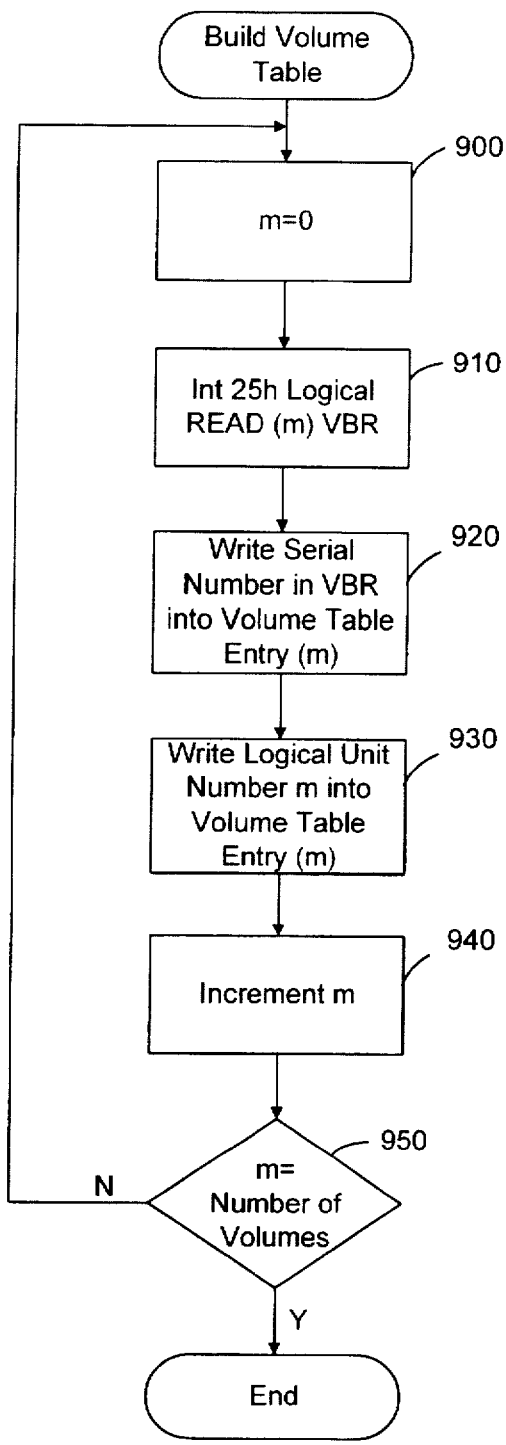
FIG. 9 is a flow diagram of the process of building a volume table in the preferred embodiment.
Figure 10:
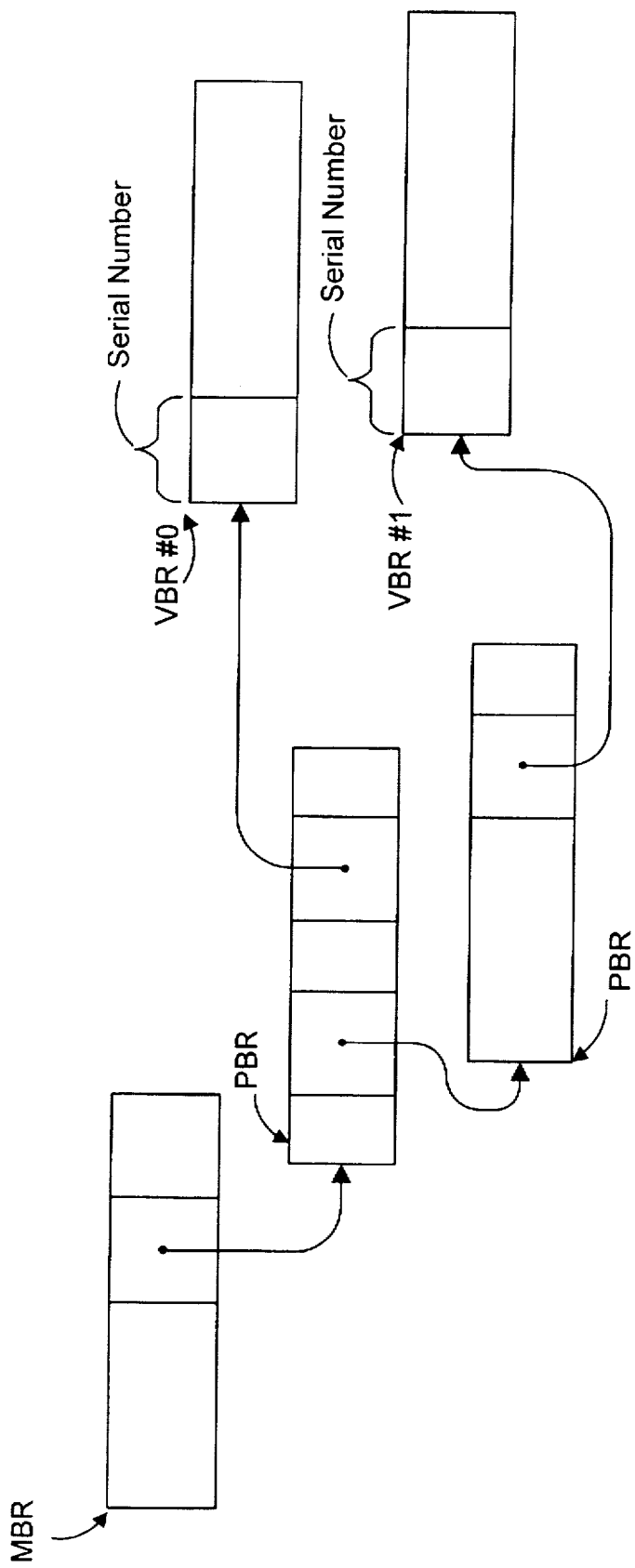
FIG. 10 is an illustration of a partition boot record and volume boot record of a volume on a disk in the preferred embodiment.

FIG. 9 is a flow diagram of the process which creates the volume table described above, referred to herein as the Build Volume Table process. The Build Volume Table process can be implemented as software stored in the memory 102 and executed by the CPU 104 when the operating system 210 is loaded. In step 900, the Build Volume Table process initializes to zero a logical volume counter m which will be described in more detail below. Control then proceeds to step 910. In step 910, the Build Volume Table process initiates an INT 25 h interrupt. The logical volume counter m is specified as the volume unit number. The Build Volume Table process also specifies the logical sector of the logical volume storing the volume boot record as an interrupt parameter. The INT 25 h interrupt causes a logical READ to be performed. The logical READ reads the designated logical sector having the specified volume boot record. This logical sector includes a unique serial number stored at a predetermined location on the volume boot record. The location of the volume boot record and serial number stored therein is obtained as shown in FIG. 10. In FIG. 10, the master boot record (MBR) of the disk on which the logical volume is provided contains a pointer to a partition boot record (PBR). The partition boot record contains a pointer to a first (VBR) which stores a serial number uniquely identifying a first logical volume. Where additional logical volumes are resident in the computer system, the partition boot record contains a pointer to a second partition boot record, as shown. The second partition boot record contains a pointer to the second volume boot record, which contains a different serial number that uniquely identifies the second volume. Additional logical volumes are represented in the same fashion.

Control then proceeds to step 920. In step 920, the Build Volume Table process writes the serial number obtained in the volume boot record into a volume table 1100, which is shown in FIG. 11. The volume table 1100 contains a volume table entry 1110 for each logical volume resident on the computer system. Each volume table entry 1110 contains a volume unit number field 1112 and a serial number field 1114. The Build Volume Table process writes the serial number into the serial number field 1114 of the volume table entry 1110 provided for the logical volume controlled by the real mode volume driver 800 to which the volume unit number m is assigned. Control then proceeds to step 930. In step 930, the Build Volume Table process writes the volume unit number m into the volume unit number field 1112 of the volume table entry 1110 into which the serial number was written in step 920. Control then proceeds to step 940, in which the volume counter m is incremented. Then, in step 950, it is determined whether all of the logical volumes have been processed. If not, control loops to step 900. If so, the Build Volume Table process ends.

Figure 12:
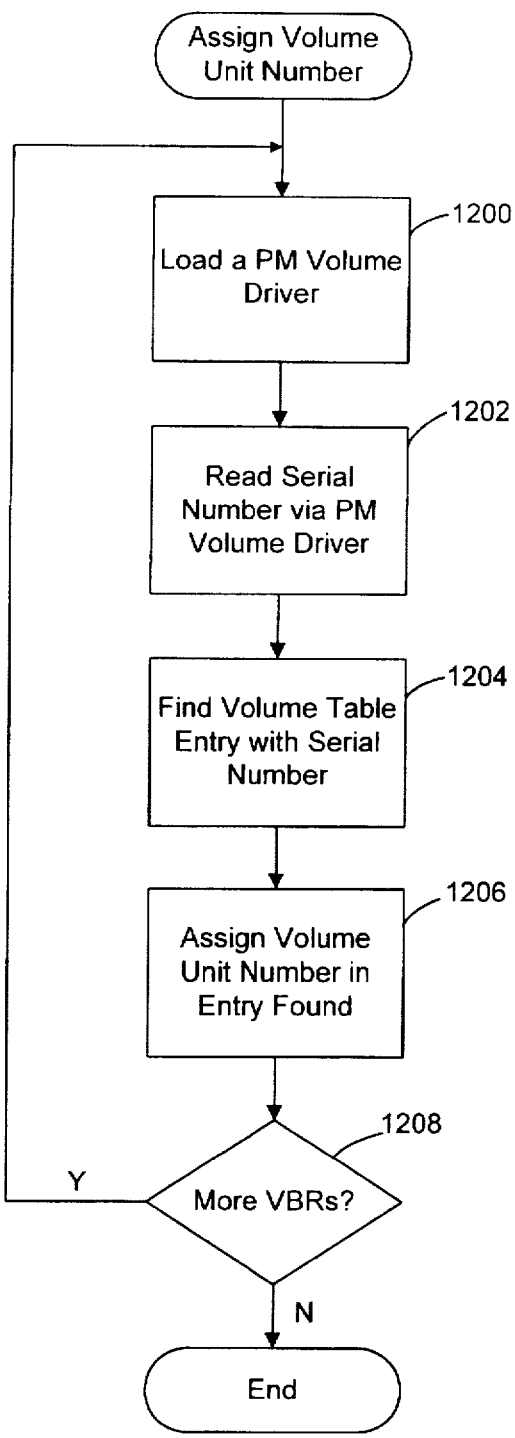
FIG. 12 is a flow diagram of the process of assigning a volume unit number in the preferred embodiment.

The volume unit numbers obtained are then assigned to the correct logical volume. A flow diagram of the process by which the volume unit numbers are assigned, called herein the Assign Volume Unit Number process, is shown in FIG. 12. The Assign Volume Unit Number process shown in FIG. 12 can be implemented as software that is stored in the memory 102 and executed by the CPU 104 when the operating system 210 is loaded. In step 1200 of the Assign Volume Unit Number process, a protected mode volume driver 810 is loaded. Control then proceeds to step 1202. In step 1202, the assign protected mode volume number process reads the serial number (by the following the path from the master boot record to partition boot record to volume boot record) from the volume boot record of the logical volume. Control then proceeds to step 1204. In step 1204, the Assign Volume Unit Number process locates the volume table entry 1110 in the volume table 1100 which contains the serial number read in step 1202. In step 1206, the volume unit number stored in the volume unit number field 1112 of the volume table entry 1110 obtained in step 1204 is assigned to the logical volume by the loaded protected mode volume driver 810. In step 1208, the Assign Volume Unit Number process determines whether there are more volume boot records (VBR's) to process. If so, control loops to step 1200. Otherwise, the Assign Volume Unit Number process ends. As a result, the real mode volume drivers 800 and the protected mode volume drivers 810 use the same drive unit numbers for the volumes which they access.

The third aspect of the invention will now be described. In the third aspect of the invention, the preferred embodiment provides consistency among the adapter numbers for the adapters 108 (FIG. 1). These adapter numbers are used by the real mode device drivers 202 and protect mode device drivers 212 to control the adapters 108 to access the peripheral devices 120 connected thereto. For example, the adapters 108 are SCSI adapters, and the MS-DOS operating system provides real mode SCSI adapter drivers. The SCSI adapter drivers include, for example, ASPI (Advanced SCSI Programming Interface) and CAM (Common Access Method) drivers. When the operating system 210 is loaded thereafter, protected mode adapter drivers are provided which control the same adapters 108 as the real mode adapter drivers.

Figure 13:
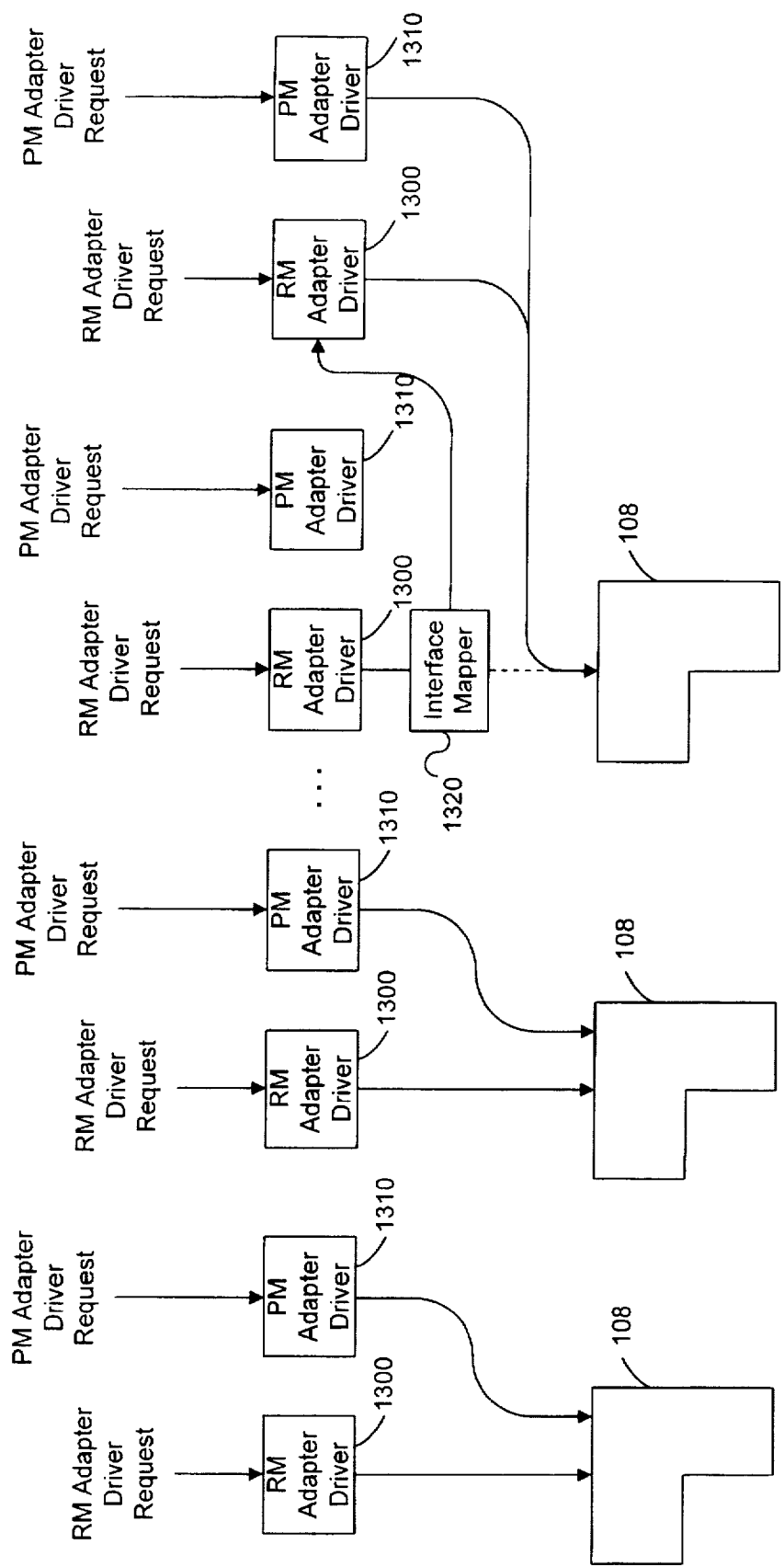
FIG. 13 is an illustration of the real mode adapter drivers and protected mode adapter drivers of the preferred embodiment.

A block diagram is shown in FIG. 13 which illustrates the relationship among the adapter drivers and the adapters 108 described above. For the protected mode adapter drivers 1310 shown in FIG. 13 to control the adapters 108 in a fashion compatible with the real mode adapter drivers 1300 that control the same adapters 108, the same adapter numbers must be assigned by the protected mode adapter drivers 1310 that the real mode adapter drivers 1300 assign to the same adapters 108. The adapter numbers are assigned by the real mode adapter drivers 1300 in an order. For example, when loaded by the MS-DOS operating system, the adapter numbers are assigned in the order that the real mode adapter drivers 1300 are loaded. The operating system 210, however, does not necessarily load the protected mode adapter drivers 1310 in the same order as the corresponding real mode adapter drivers 1300. Thus, it cannot be ensured that the same adapter numbers will be assigned to the real mode adapter drivers 1300 and the protected mode adapter drivers 1310 which control the same adapters 108.

Additionally, some application programs may request to use the real mode adapter drivers 1300, even when protected mode drivers are present. A still further complication is that an interface mapper 1320 may be provided which maps requests to access peripherals via a real mode adapter driver 1300 of one interface type (e.g., ASPI) to a real mode adapter driver 1300 of a different interface type (e.g., CAM). Thus, application program requests to access the real mode adapter drivers must be mapped to the protected mode adapter drivers 1310 which control the same adapters 108.

Further, requests to access real mode adapter drivers 1300 which are mapped by an interface mapper 1320 to a destination real mode adapter driver 1300 must also be mapped to a protected mode adapter driver 1310 that corresponds to the destination real mode adapter driver 1300.

To provide consistent assignment of adapter numbers and mapping of requests to the correct protected mode adapter driver 1310, the preferred embodiment first creates for each adapter 108 a real mode data structure 1500, which will be described in greater detail with reference to FIG. 15 below. The real mode data structure associates the adapter number assigned by a real mode adapter driver 1300 to the adapter 108 which the real mode adapter driver controls with peripheral information obtained from each peripheral device 120 connected to the same adapter 108. When an interface mapper 1320 is provided, the real mode data structure also associates the adapter number and peripheral information with an interface type. The interface type defines the type of interface of the destination real mode adapter driver 1300 to which requests to the real mode adapter driver 1300 are mapped by the interface mapper 1320.

When the protected mode adapter drivers 1310 are loaded thereafter, a data control block 1800 is created for each peripheral device 120 connected to an adapter 108. The data control block 1800 will be described in greater detail with reference to FIG. 18 below. The data control block contains peripheral information obtained from each peripheral 120 via the adapter 108 controlled by the protected mode adapter driver 1310. The peripheral information in each data control block is then compared to the peripheral information stored in the real mode data structures 1500. When the peripheral information is the same, the adapter number is extracted from the real mode data structure 1500. The extracted adapter number is assigned to the adapter 108 connected to the peripheral 120 for which the data control block is provided by the protected mode adapter driver 1310 which controls that adapter 108.

In the case where an interface mapper 1320 is provided, the peripheral information in more than one real mode data structure may match the peripheral information in the data control block 1800. In such a case, the adapter number which corresponds to the destination real mode adapter driver 1300 is assigned to the adapter 108 connected to the peripheral 120 corresponding to the data control block by the protected mode adapter driver which controls that adapter 108. This adapter number is obtained from the real mode data structure that associates the adapter number with an interface type (i.e., the interface type of the destination real mode adapter driver 1300).

Figure 14:
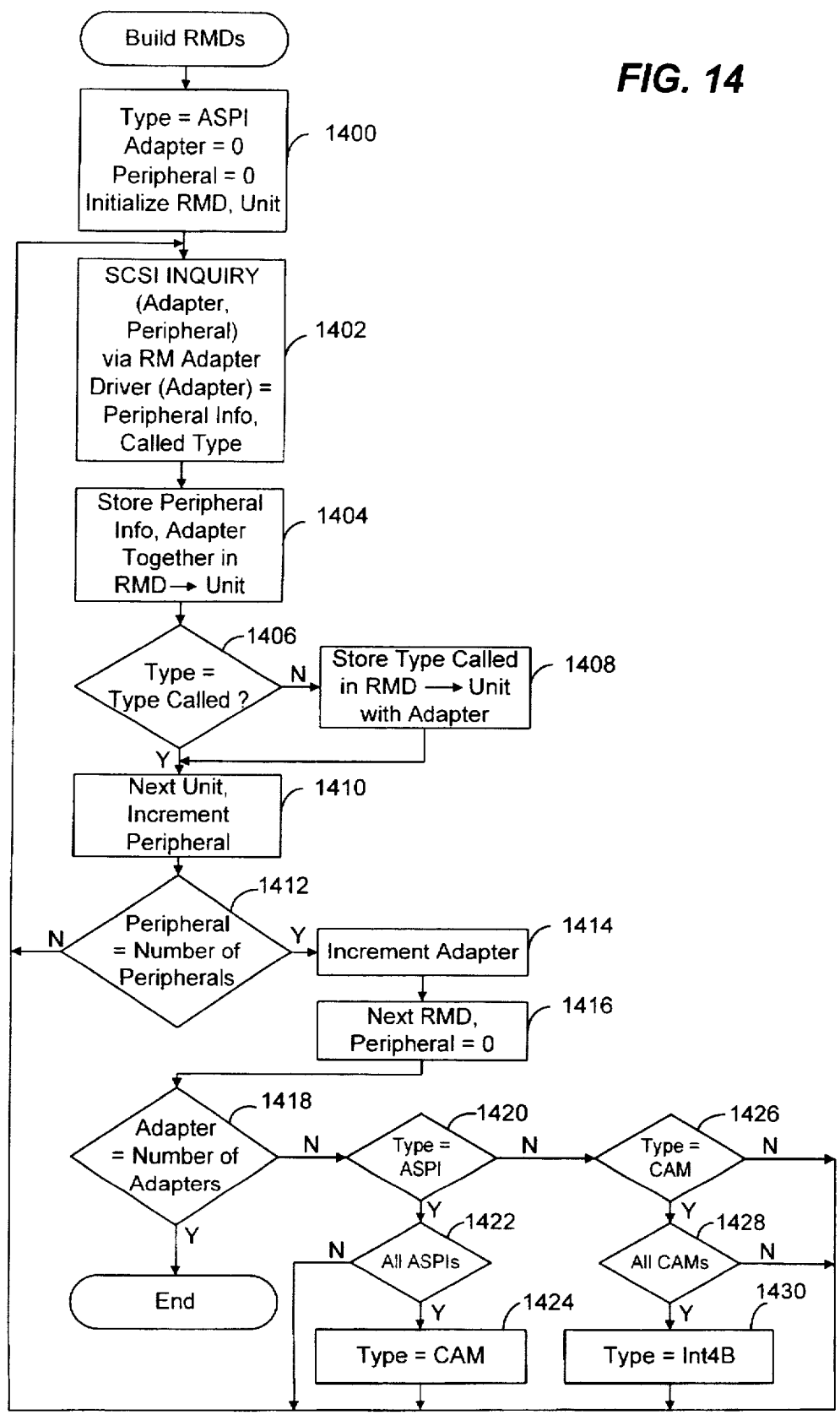
FIG. 14 is a flow diagram of the process of building a real mode data structure in the preferred embodiment.

A flow diagram of the process which creates the real mode data structures described above, referred to herein as the Build Real Mode Data Structures (RMDs) process, is shown in FIG. 14. The Build RMDs process can be implemented as software stored in the memory 102 and executed by the CPU 104. In step 1400, the Build RMDs process initializes the interface type, adapter counter, peripheral counter, and real mode data structure (all of which will be described in more detail below). In step 1402, the Build RMDs process provides an SCSI inquiry instruction via the real mode adapter driver 1300 to which the adapter number indicated by the adapter counter (initially 0) is assigned. The SCSI inquiry instruction obtains peripheral information from the peripheral device 120 indicated by the peripheral unit counter (initially 0 for each adapter). Then, in step 1404, the Build RMDs process stores the peripheral information and the adapter number together in a unit specifier corresponding to the peripheral 120 and associated with the real mode data structure corresponding to the adapter 108.

Figure 15:
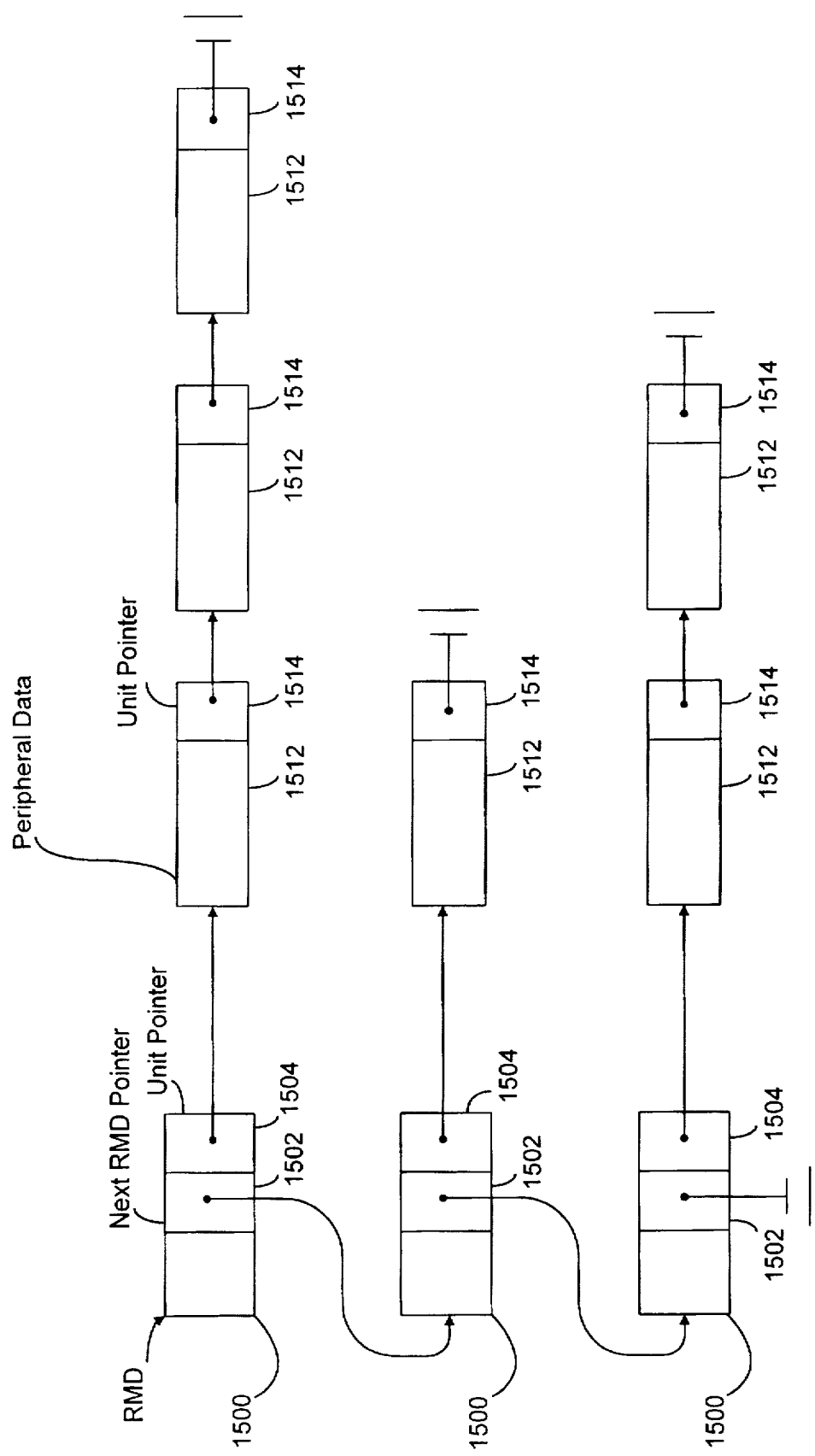
FIG. 15 is an illustration of the real mode data structure created in the preferred embodiment and unit specifies associated with each real mode data structure.
Figure 16:
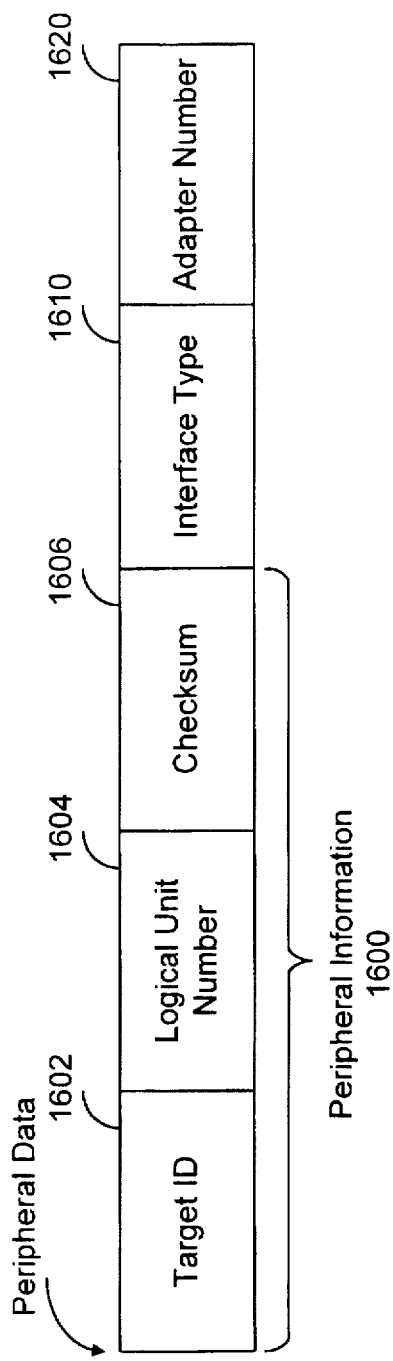
FIG. 16 is an illustration of peripheral data in each unit specifier created in the preferred embodiment.

The real mode data structure and unit specifier are shown in detail in FIG. 15. Each RMD 1500 contains a next RMD pointer 1502 and a unit pointer 1504. The next RMD pointer 1502 points to a next RMD corresponding to a next real mode adapter driver 1300. The next real mode adapter driver 1300 is the adapter driver that was loaded next after the real mode adapter driver 1300 to which the RMD 1500 corresponds. The unit pointer 1504 points to a first unit specifier 1510 having a peripheral data field 1512 and a unit pointer 1514. The unit pointer 1514 points to a next unit specifier 1510 corresponding to a next peripheral device 120 connected to the adapter 108 that corresponds to the RMD 1500. The specific contents of the peripheral data field 1512 are shown in FIG. 16. The peripheral data field 1512 contains peripheral information 1600 comprising a target ID 1602, a logical unit number 1604, and a checksum 1606 obtained from the peripheral device 120 to which the unit specifier 1510 corresponds. The peripheral data field 1512 further includes an interface type 1610 and an adapter number 1620 which corresponds to the adapter 108 to which the RMD 1500 corresponds.

After the peripheral information is stored in step 1404 of the Build RMDs process, control proceeds to step 1406. In step 1406, the Build RMDs process determines whether a real mode adapter driver 1300 has been called in performing the SCSI inquiry instruction which differs from the interface type initially specified. For example, the interface type is initially set to ASPI, such that the SCSI inquiry instruction is first provided via all real mode adapter drivers 1300 which are ASPI drivers. In such a case, the Build RMDs process initially determines in step 1406 whether a real mode adapter driver 1300 having an interface type other than ASPI has been called. A real mode adapter driver 1300 having a different interface type is called whenever an interface mapper 1320 is provided which maps requests to the real mode adapter driver 1300 to a different, destination real mode adapter driver 1300. If, in step 1406, the Build RMDs process determines that a different interface type has been called, then control branches to step 1408. In step 1408, the Build RMDs process stores the interface type of the destination real mode adapter driver 1300 as the interface type 1610 in the peripheral data field 1512 of the RMD 1500, replacing the zero values initially stored in the peripheral data field 1512. The RMD 1500 into which the interface type is stored corresponds to the real mode adapter driver 1300 to which the adapter number represented by the adapter counter is assigned.

If, in step 1406, the Build RMDs process determines that a different interface type is not called, then control proceeds to step 1410. Control also proceeds to 1410 after step 1408 is performed. In step 1410, the peripheral counter is incremented and the next unit specifier 1510 is obtained. Control proceeds to step 1412. In step 1412, the Build RMDs process determines whether all of the peripheral devices 120 connected to the adapter 108 have been processed. Is so, control loops back to step 1402. If not, control branches to step 1414, in which the adapter counter is incremented.

Control then proceeds to step 1416 wherein the peripheral counter is reset to 0 and the next RMD is obtained. In step 1418, the Build RMDs process determines whether all of the adapters 108 have been processed. If so, the Build RMDs process ends. If not, control branches to step 1420, in which the Build RMDs routine determines whether the interface type of the last real mode adapter driver 1300 is ASPI. If so, then in step 1422 the Build RMDs routine determines whether all of the ASPI drivers have been processed. If not, control loops to step 1402. If so, control proceeds to step 1424, in which the interface type is set to CAM. Control then loops to step 1402. If, in step 1420, the Build RMDs process determines that the interface type is not ASPI, then control branches to step 1426, in which the Build RMDs process determines whether the interface type of the last real mode adapter driver 1300 is CAM. If so, control proceeds to step 1426, wherein the Build RMDs process determines whether all CAM drivers have been processed. If not, control loops to step 1402. If so, control proceeds to step 1430 wherein the interface type is set to INT 4 B. Control then loops to step 1402.

Figure 17:
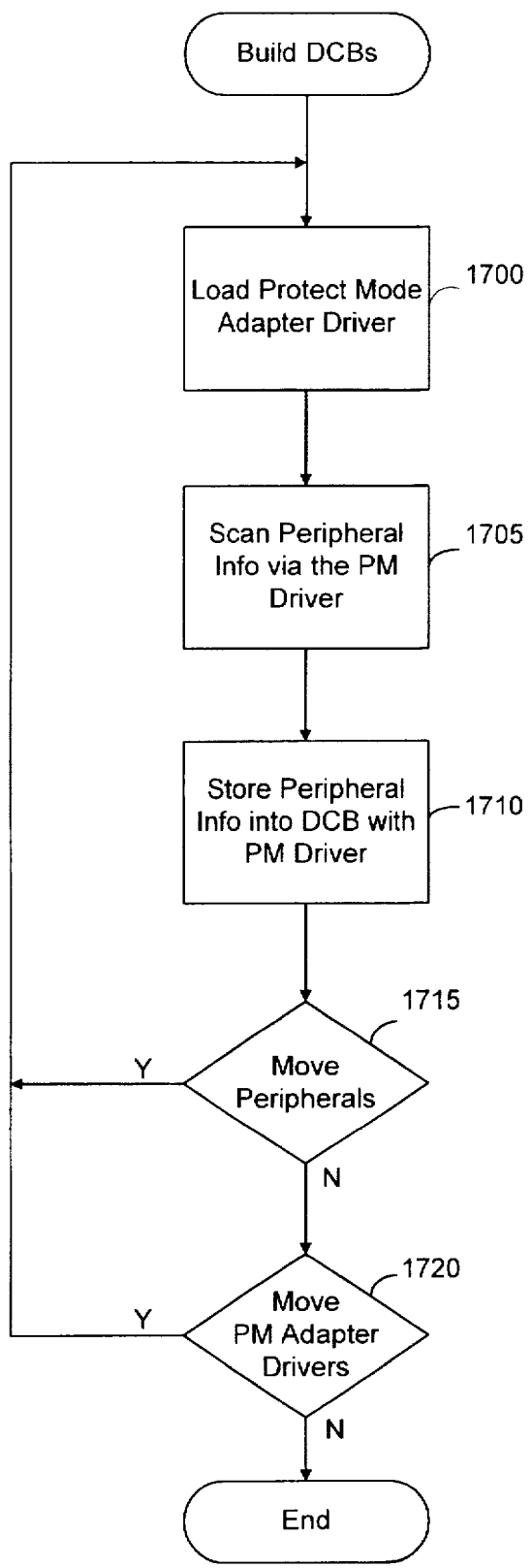
FIG. 17 is a flow diagram of the process of creating data control blocks in the preferred embodiment.
Figure 18:
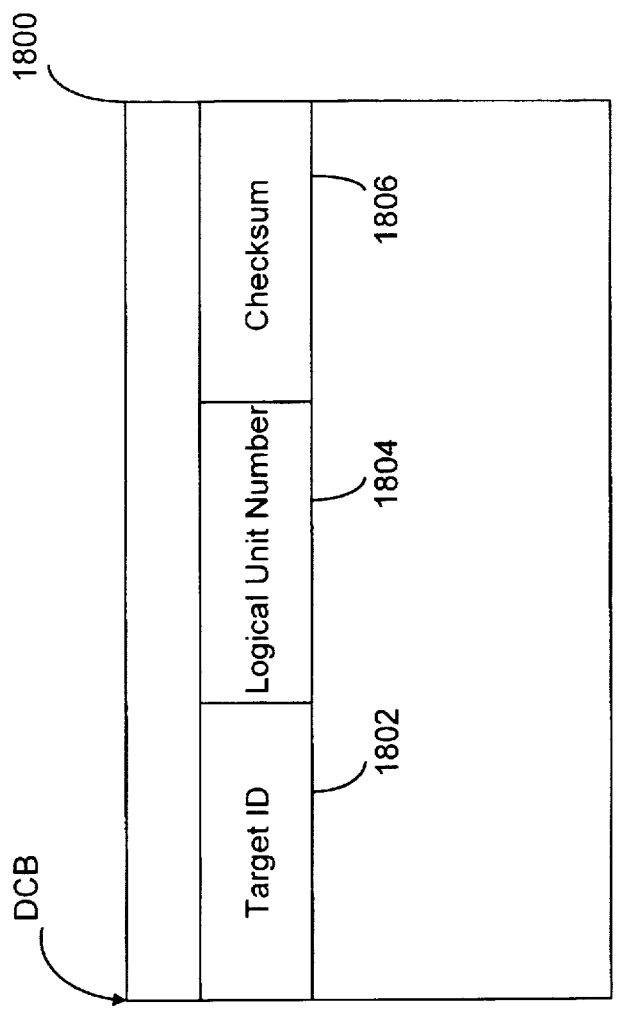
FIG. 18 is an illustration of the data control block created in the preferred embodiment.

The process which creates the device control blocks, referred to herein as the Build Device Control Blocks (DCBs) process, is shown in FIG. 17. The Build DCBs process can be implemented as software stored in the memory 102 and executed by the CPU 104 when the operating system 210 is loaded. In step 1700, the Build DCBs process loads a protected mode adapter driver 1310. Control then proceeds to step 1705. In step 1705, the Build DCBs process scans the peripheral information via the loaded protected mode driver 1310 from a peripheral device 120 connected to the adapter 108 which is controlled by the loaded protected mode adapter driver 1310. Control then proceeds to step 1710. In step 1710, the Build DCBs process stores the peripheral information scanned in step 1705 into a device control block (DCB) corresponding to the loaded protected mode adapter driver 1310. The device control block (DCB) into which the peripheral information is stored is shown in FIG. 18. As shown in FIG. 18, the device control block 1800 contains a target ID 1802 which identifies the peripheral device, a logical unit number 1804, and a checksum 1806 based on the peripheral information scanned from the peripheral device 120 connected to the adapter 108 controlled by the loaded protected mode adapter driver 1310.

Control then proceeds to step 1715. In step 1715, the Build DCBs process determines whether more peripheral devices 120 are connected to the adapter 108 which is controlled by the loaded protected mode adapter driver 1310. If so, control loops to step 1700. Otherwise, control proceeds to step 1720, in which the Build DCBs process determines whether more protected mode adapter drivers are to be loaded. If the Build DCBs routine determines in step 1720 that more protected mode adapter drivers 1310 are to be loaded, then control loops to step 1700. Otherwise, the Build DCBs process ends.

Figure 19:
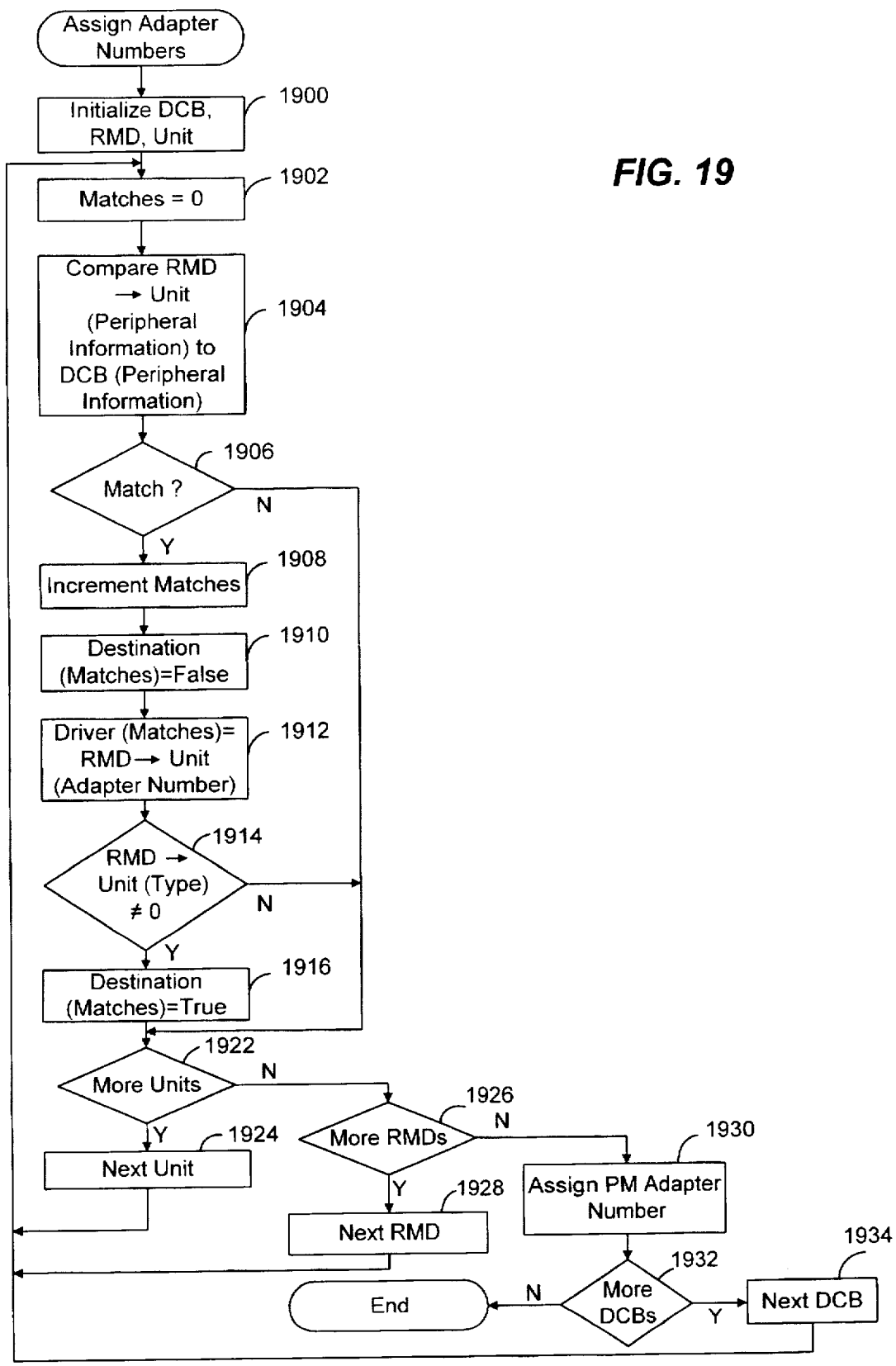
FIG. 19 is a flow diagram of the process of assigning adapter numbers in the preferred embodiment.

A flow diagram of the process which assigns the adapter numbers to the protected mode adapter drivers 1310, referred to herein as the Assign Adapter Numbers process, is shown in FIG. 19. The Assign Adapter Numbers process may be implemented as software stored in the memory 102 and executed by the CPU 104. In step 1900, the Assign Adapter Numbers process initializes the DCBs 1800, the RMDs 1500 and the unit specifiers 1510, which will be explained. In step 1902, a "matches" counter is initially set to 0, which will also be explained. In step 1904, the peripheral information stored in a unit specifier 1510 of an RMD 1500 is compared to the peripheral information stored in a DCB 1800. Control then proceeds to step 1906. In step 1906, the Assign Adapter Numbers process determines whether the peripheral information in the unit specifier 1510 is the same as the peripheral information in the DCB 1800.

If, in step 1906, it is determined that the peripheral information matches, control proceeds to step 1908. In step 1908, the matches counter is incremented. Control then proceeds to step 1910, in which a destination flag indexed by the value of the matches counter is initially set to be False.

Control then proceeds to step 1912. In step 1912, the adapter number stored in the unit specifier 1510 is assigned to a "Driver" variable indexed by the value of the matches counter. The Driver variable tentatively contains the adapter number of the protected mode adapter driver 1310 corresponding to the DCB 1800. Control then proceeds to step 1914. In step 1914, it is determined whether an interface type 1610 (a non-zero value) is stored in the peripheral data field 1512 of the unit specifier 1510. The interface type 1610 is initially a zero value, and is set to an interface type only when stored in step 1408 of the Build RMDs process in FIG. 14. Step 1408 is only performed when an interface mapper 1320 has been provided which maps a request to a real mode adapter driver 1300 to a different, destination real mode adapter driver 1300. If, in step 1914, it is determined that a non-zero value is stored as the interface type 1610 in the peripheral data field 1512 of the unit specifier 1510, then control proceeds to step 1916. In step 1916, the destination flag indexed by the value of the matches counter is set to True.

Control then proceeds to step 1922, in which the Assigned Adapter Number process determines whether more unit specifiers 1510 correspond to the RMD 1500. If so, control proceeds to step 1924, in which the next unit specifier 1510 is obtained, and control then loops to step 1902. Otherwise, control branches to step 1926, in which it is determined whether more RMDs 1500 are provided. If so, the next RMD 1500 is obtained and control loops to step 1902. Otherwise, control branches to step 1930. In step 1930, the adapter number of the matching RMD is assigned to the adapter 108 to the protected mode adapter driver 1310 corresponding to the DCB which matches that RMD. When more than one RMD matched the DCB, the adapter number stored in the RMD that is associated with an interface type (that of the destination real mode adapter driver) is assigned by the protected mode adapter driver 1310. This assignment can be illustrated by the following pseudocode:

```
if matches = 1
    then adapter number = Driver (matches)
if matches > 1
    then for n = 1 to matches
        if destination (matches) = True
            then adapter number = Driver (matches).
```

Control then proceeds to step 1932, wherein it is determined whether more DCBs are to be processed. If so, control proceeds to step 1934, in which the next DCB is obtained, and control then loops to step 1902. If not, the routine ends.

In a fourth aspect of the invention, the preferred embodiment provides protected mode accommodation of real mode functional drivers 204 which have been provided. In the fourth aspect of the invention, the preferred embodiment first detects the use of such real mode functional drivers 204. The preferred embodiment determines whether the functionality of the detected real mode functional drivers 204 is provided by a resident protected mode functional driver. If so, requests to the real mode functional drivers are mapped to the protected mode functional drivers 214. If not, the preferred embodiment adapts the real mode functional drivers 204 to work with the protected mode device drivers 212 instead of the real mode device drivers 202.

Figure 20:
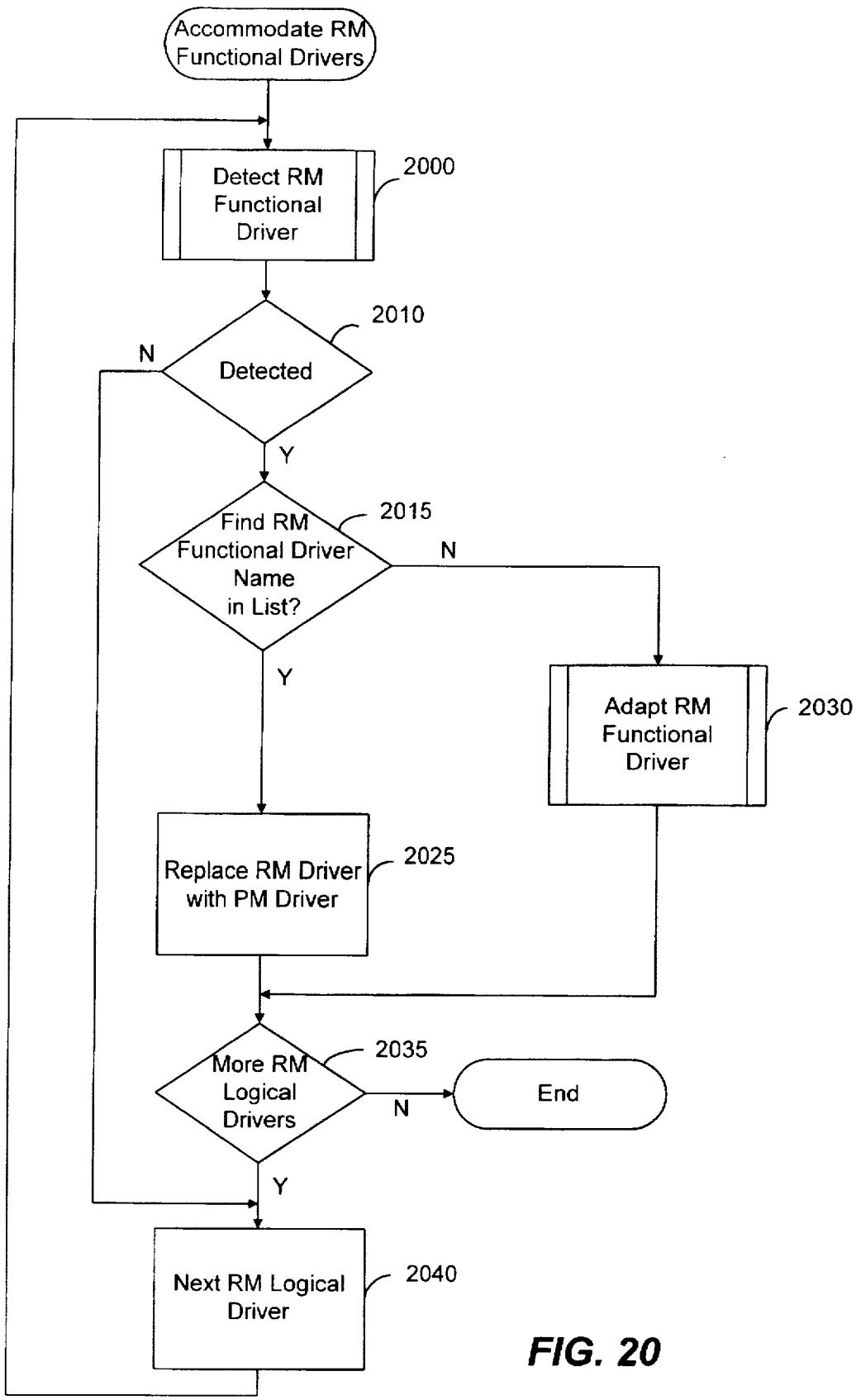
FIG. 20 is a flow diagram of the process of accommodating real mode functional drivers in the preferred embodiment.
Figure 21:
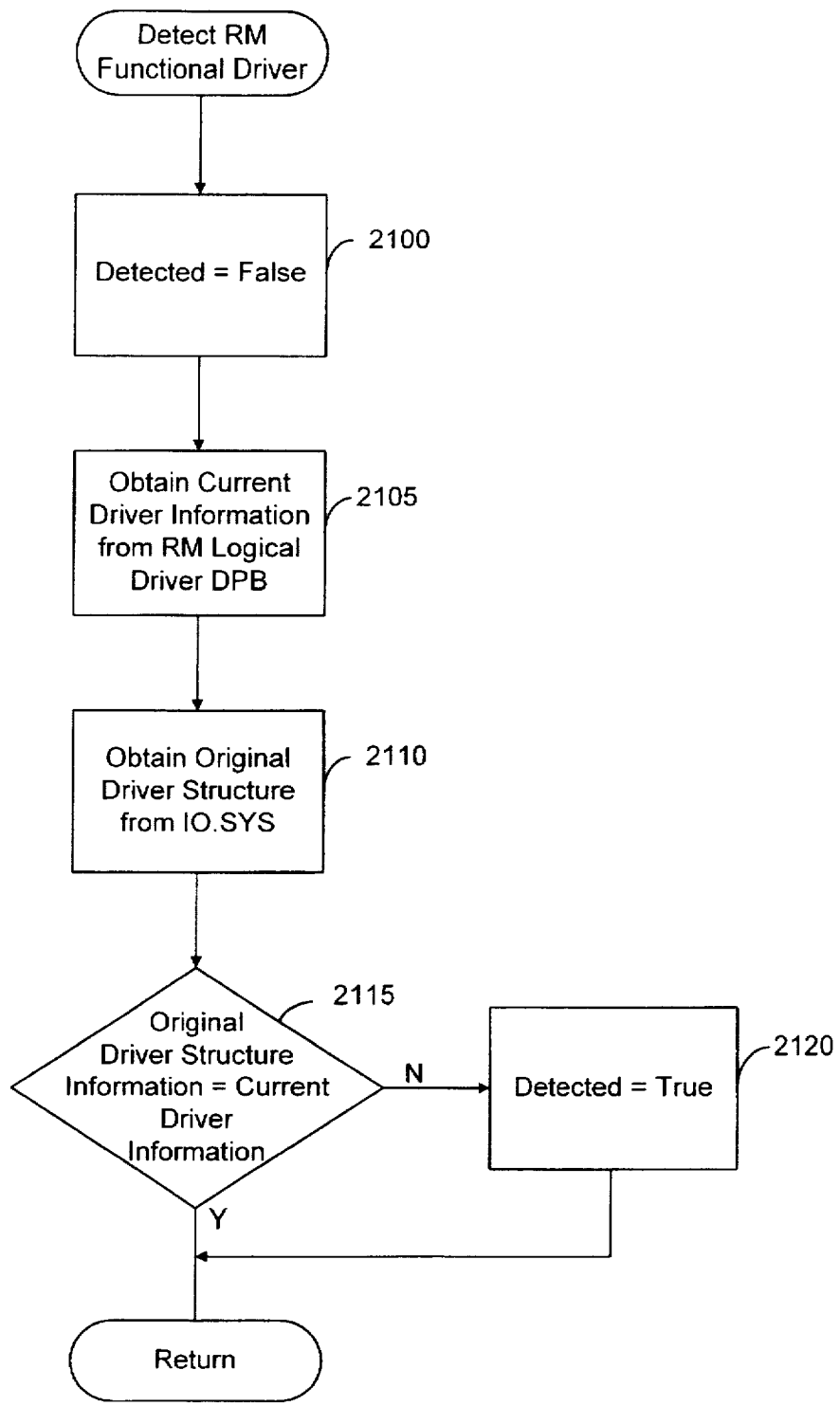
FIG. 21 is a flow diagram of the process of detecting a real mode functional driver in the preferred embodiment.

The process which accommodates the real mode functional drivers, referred to herein as the Accommodate Real Mode (RM) Functional Drivers process, is shown in FIG. 20. The Accommodate Real Mode Functional Drivers process may be implemented as software stored in the memory 102 and executed by the CPU 104. In step 2000 of the Accommodate Real Mode Functional Drivers process, the Accommodate Real Mode Functional Drivers process performs a Detect Real Mode Functional Driver process which detects a real mode functional driver. The Detect Real Mode Functional Driver process is shown in FIG. 21. In step 2100 of the Detect Real Mode Functional Driver process the Boolean value "detected" is initially set to False. Control then proceeds to step 2105. In step 2105, the Detect Real Mode Functional Driver process obtains current driver information from a disk parameter block provided for a real mode logical driver.

Figure 22:
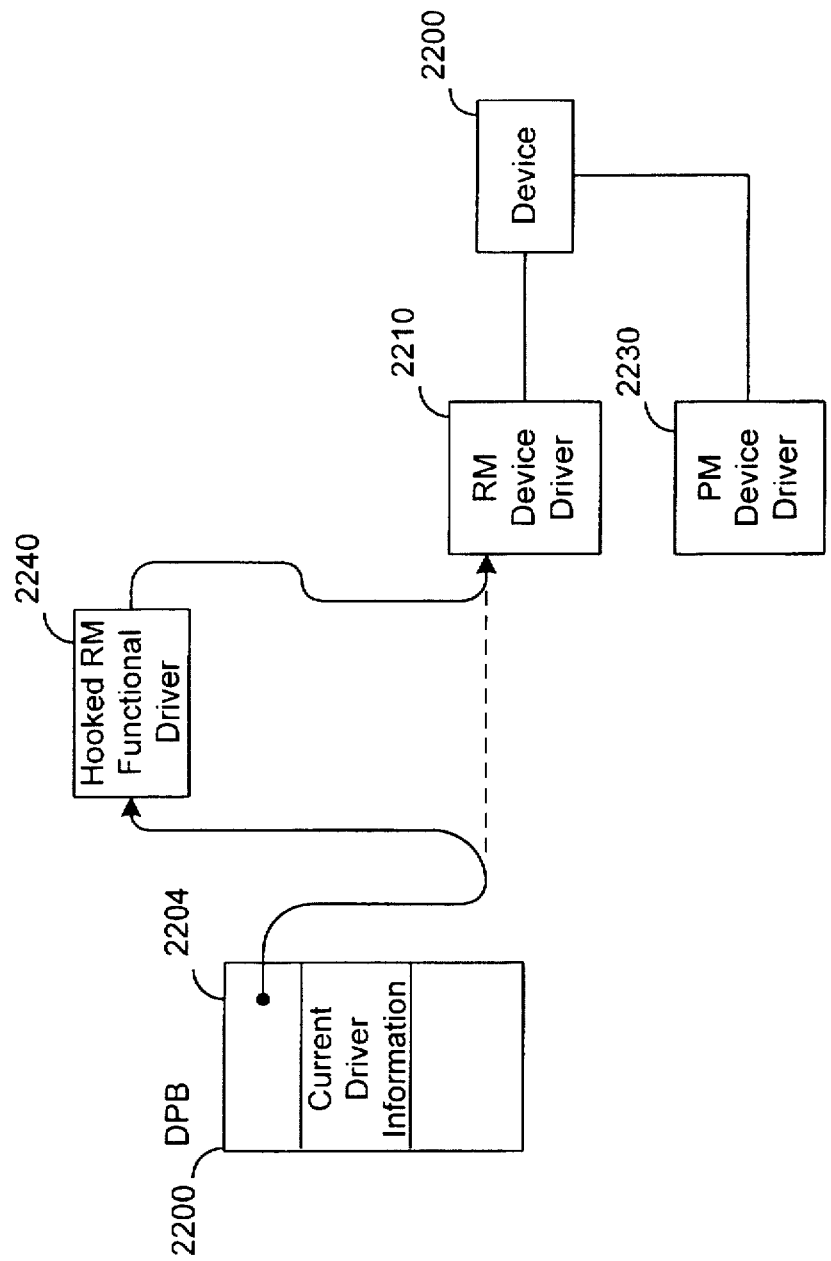
FIG. 22 is an illustration of a data parameter block. the contents of a portion thereof and the real mode device drivers or functional drivers specified therein.

The disk parameter block is shown in FIG. 22. As shown in FIG. 22, the data parameter block 2200 contains current driver information 2202 and a pointer 2204 to a first driver to execute. Initially, the pointer 2204 in the data parameter block 2200 points to a real mode device driver 2210 which controls a device 2220 also controlled by a protected mode device driver 2230. Where a real mode functional driver 2240 has been provided to supplement the real mode device driver 2210, however, the calls to be real mode functional driver 2240 are hooked such that the pointer 2204 points to the real mode functional driver 2240. In such a case, the current driver information 2202 describes the real mode functional driver 2240 instead of the real mode device driver 2210 originally described thereby. It should be appreciated that the functional drivers may be part of the real mode drivers rather than separate drivers.

Figure 23:
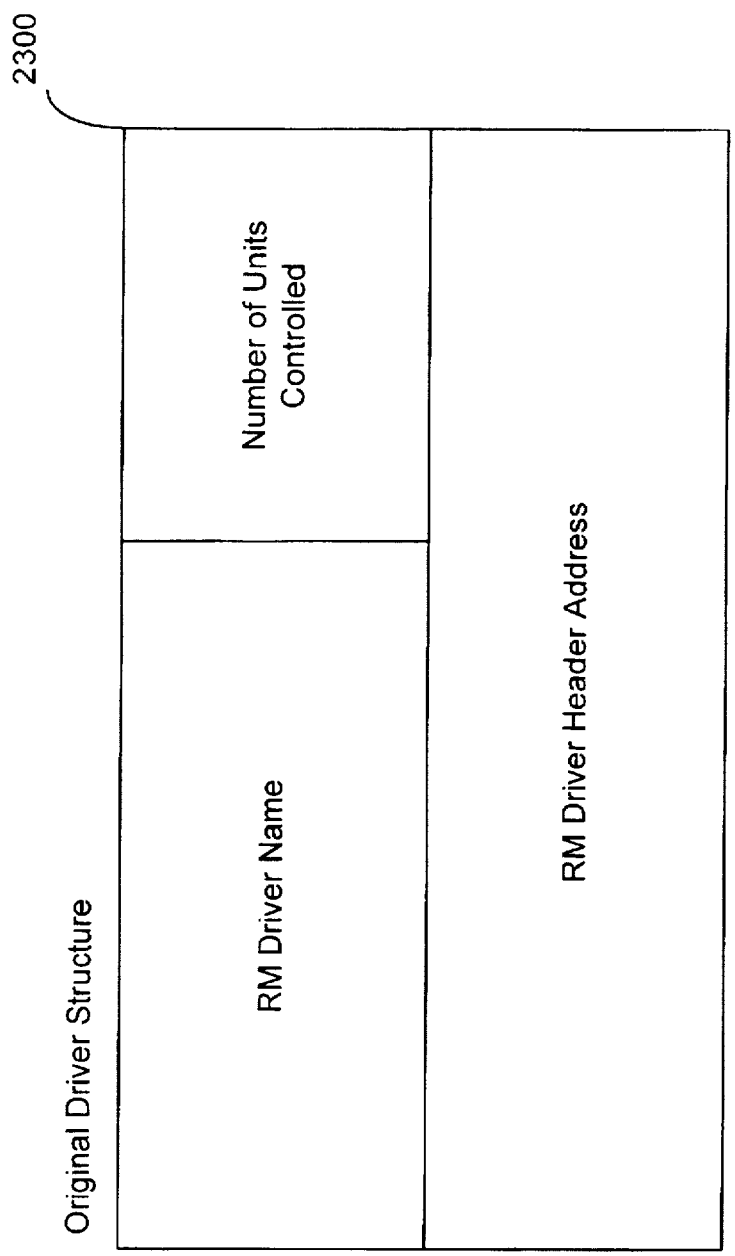
FIG. 23 is an illustration of an original driver structure in the preferred embodiment.

Control then proceeds to step 2110. In step 2110, the Detect Real Mode Functional Driver process obtains an original driver structure from the IO.SYS module. The IO.SYS software module is a well-known module provided by the hardware manufacturer of the computer system to start up the MS-DOS operating system 200. The original driver structure is shown in FIG. 23. The original driver structure contains a real mode driver name, a number of units controlled, and a real mode driver header address. Control then proceeds to step 2115 in which the real mode driver name, a number of units controlled and the real mode driver header address in the original driver structure 2300 are compared to the current driver information corresponding to the same device 2220. Where a real mode functional driver 2240 has been provided, the information in the original driver structure 2300 will not match the current driver information 2202 in the data parameter block 2200. Thus, when in step 2115 it is determined that the current driver information does not match, control proceeds to step 2120, wherein the "detected" flag is set to True. Otherwise, the detected flag remains False. The process then returns to continue performing the Accommodate Real Mode Functional Drivers process shown in FIG. 20.

Figure 24:
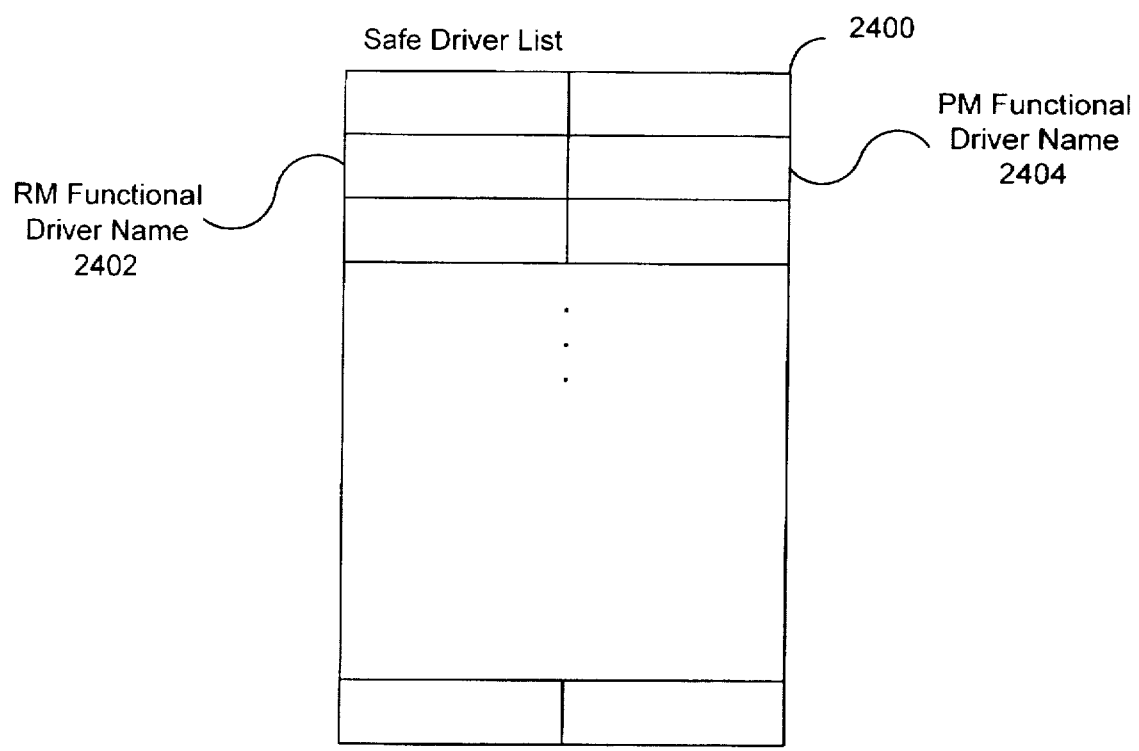
FIG. 24 is an illustration of a safe driver list in the preferred embodiment.

After the Detect Real Mode Functional Driver process has been performed in step 2000 of the Accommodate Real Mode Functional Drivers process, control proceeds to step 2010. In step 2010, it is determined whether the detected flag was set to be True by the Detect Real Mode Functional Driver process. If so, control proceeds to step 2015. In step 2015, it is determined whether the real mode functional driver name is found in a "safe driver" list. The safe driver list is illustrated in FIG. 24. In FIG. 24, the safe driver list 2400 contains a list of real mode functional driver names 2402. If, in step 2015, the real mode functional driver name is found on the safe driver list, then control proceeds to step 2025. In step 2025, the Accommodate Real Mode Functional Drivers process maps real mode functional driver requests to the protected mode driver identified in the safe driver list.

If the real mode functional driver name is not found in the safe driver list in step 2015, then control branches to step 2030, in which the Adapt Real Mode Functional Drivers process is performed. Control then proceeds to step 2035, wherein the Accommodate Real Mode Functional Drivers process determines whether more real mode logical drivers are provided. If so, control proceeds to step 2040 in which the next real mode logical driver is obtained, and control then loops to step 2000. If not, the Accommodate Real Mode Functional Drivers process ends.

Figure 25:
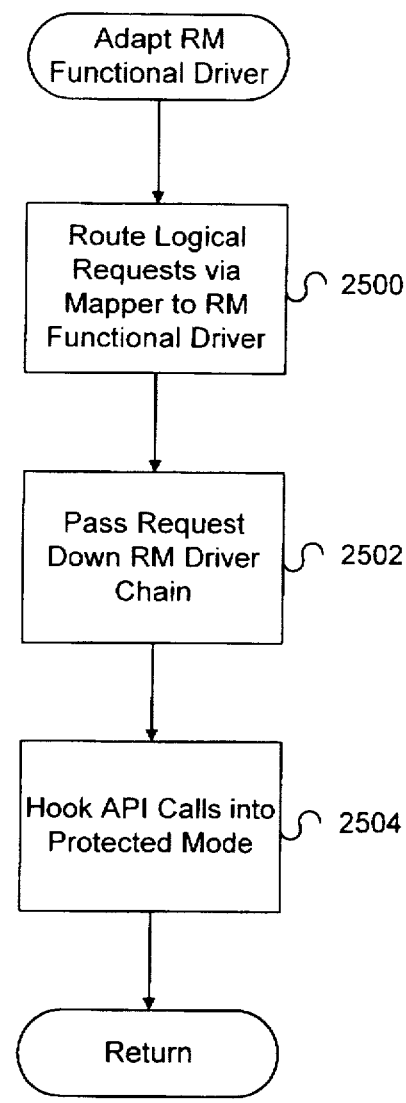
FIG. 25 is a flow diagram of the process of adapting a real mode functional driver in the preferred embodiment.

FIG. 25 shows several of the major functional steps performed by the Adapt Real Mode Functional Driver process. This process is performed by executing software that is stored in memory 102 and executed by the CPU 104. This process is invoked when the protected mode driver is not on the safe driver list and, thus, the Real Mode Functional Driver must be relied upon to provide the desired functionality. Hence, as shown in FIG. 25, the logical requests to the protected mode driver are routed via a real mode mapper to a real mode functional driver (step 2500). This request is then passed down the real mode driver chain until the request reaches the last driver in the chain (step 2502). API calls by the real mode driver are hooked into protected mode (step 2504). Thus, ASPI, CAM or INT 13 h API calls are hooked into protected mode. If there are no API calls, there is no hook into protected mode.

Although the present invention has been described with reference to one or more specific embodiments, it should be appreciated that various changes can be made by one of ordinary skill in the art without departing from the spirit of the invention. The scope of the invention is Properly defined by the claims.

We claim:

1. In a computer having a connection to a device, a processor that can operate in real mode and protected mode, a real mode device driver for the device and a protected mode device driver for the device, a method comprising the steps of:

(a) with the real mode device driver, assigning a unique reference value to the device that is accessed by the real mode device driver;

(b) accessing the device by the real mode device driver, to read device information which uniquely identifies the device;

(c) storing the reference value assigned to the device by the real mode device driver in a memory location associated with the device information read from the device;

(d) with the protected mode device driver, accessing the device to read the device information;

(e) retrieving the reference value that was stored in the memory location associated with the device information; and (f) with the protected mode device driver so that both the real mode device driver and the protected mode device driver identify the device with the reference value, assigning the reference value obtained in step (e) to the device accessed by protected mode device driver.

2. The method of claim 1 wherein step (c) comprises storing the reference value and the device information in a same entry in a data structure having an entry for each device connected to the computer.

3. In a computer having a connection to a disk, a processor that can operate in real mode and protected mode, a real mode disk driver for the disk and a protected mode disk driver for the disk, a method comprising the steps of:

(a) with the real mode disk driver, assigning a unique drive unit number to the disk drive that is accessed by the real mode disk driver;

(b) accessing the disk drive by the real mode disk driver, to read disk information which uniquely identifies the disk residing on the disk drive;

(c) storing the drive unit number identifying the disk in a memory location associated with the disk information read from the disk;

(d) with the protected mode disk driver, accessing the disk drive to read the disk information from the disk residing on the disk drive;

(e) retrieving the drive unit number that was stored in the memory location associated with the disk information; and (f) with the protected mode disk driver, assigning the drive unit number retrieved in step (e) to the disk drive accessed by the protected mode disk driver.

4. The method of claim 3 wherein step (b) comprises reading a unique value stored on a predetermined location on the disk as the disk information, and wherein step (c) comprises storing the drive unit number with the unique value in a same entry in a table data structure having an entry for each disk drive connected to the computer.

5. The method of claim 4, further comprising the steps of (g) determining whether the disk stores a unique value in the predetermined location, and (h) writing the unique value into the predetermined location if it is determined in step (g) that the disk does not store a unique value in the predetermined location.

6. In a computer system having a disk drive having a disk containing at least one logical volume, a processor that can operate in a real mode and a protected mode, a real mode volume driver for accessing the volume on the disk and a protected mode volume driver, a method comprising the steps of:

(a) with the real mode volume driver, assigning a unique volume unit number to the volume accessed by the real mode volume driver;

(b) accessing the volume to read volume information which uniquely identifies the volume;

(c) storing the volume unit number assigned to the logical volume by the real mode volume driver in a memory location associated with the volume information read from the disk;

(d) with the protected mode volume driver, accessing the volume to read the volume information;

(e) retrieving the volume unit number stored in the memory location associated with the volume information read by the protected mode volume driver; and (f) with the protected mode volume driver, assigning the volume unit number obtained in step (e) to the disk accessed by the protected mode volume driver.

7. In a computer system having an adapter that is connected to a peripheral device, a processor that can operate in a real mode and protected mode, a protected mode adapter driver for controlling the adapter and a real mode adapter driver for controlling the adapter, a method comprising the steps of:

(a) with the real mode adapter driver, assigning a unique adapter number to the real mode device driver;

(b) with the real mode adapter driver, scanning, from a peripheral device via the adapter, peripheral device information which uniquely identifies the peripheral device;

(c) storing the adapter number assigned to the adapter in a memory location associated with the peripheral device information read from the peripheral device;

(d) with the protected mode adapter driver, controlling the adapter to access the peripheral device to scan the peripheral device information;

(e) retrieving the adapter number stored in the memory location associated with the peripheral device information; and (f) with the protected mode adapter driver, assigning the adapter number obtained in step (e) to the adapter.

8. In a computer system having a protected mode functional driver and a corresponding real mode functional driver, a method of determining whether to execute a protected mode functional driver instead of a real mode functional driver, the method comprising the computer-implemented steps of:

(a) designating the protected mode functional drivers as being executable instead of the corresponding real mode functional driver.

(b) detecting the real mode functional driver in the computer;

(c) determining whether the protected mode functional drivers have been designated as being executable instead of the detected real mode functional driver;

(d) executing the protected mode functional driver instead of the detected real mode functional driver when it is determined in step (b) that the protected mode functional driver has been designated as being executable instead of the real mode functional driver.

9. A computer system having;

a computer with a processor and a memory and connected to one or more devices;

a real mode device driver stored in the memory and executed by the processor, and assigning a reference value to the device that the real mode device driver accesses;

a protected mode device driver stored in the memory and executed by the processor; and means for the protected mode device driver to assign a same reference value to the device the protected mode device driver accesses as the real mode device driver assigns to the same device.

10. The computer system of claim 9 wherein the device comprises a disk drive on which a physical disk resides, the real mode device driver is a real mode disk driver which controls the disk drive to access the physical disk in real mode and the protected mode device driver is a protected mode disk driver which control the disk drive to access the physical disk in protected mode, and wherein the means for the protected mode device driver assigning the same reference value comprises the protected mode disk driver assigning a same drive unit number to the disk drive as the real mode disk driver which accesses the same physical disk.

11. The computer system of claim 10 wherein the means for the protected mode device driver assigning the same reference value comprises a drive table having an entry for each real mode disk driver, the entry containing a unique value stored on the physical disk accessed by the real mode disk driver and containing a drive unit number which has been previously assigned by the real mode disk driver, and means for the protected mode disk driver to assign the reference value contained in the entry to the physical disk which stores the unique value also contained in the entry.

12. The computer system of claim 9 wherein the device comprises a disk drive on which a logical volume resides, the real mode device driver is a real mode volume driver which controls the disk drive to access the logical volume in real mode and the protected mode device driver is a protected mode volume driver which controls the disk drive to access the logical volume in protected mode, and wherein the means for the protected mode device driver to assign the same reference value comprises the protected mode disk driver assigning a same volume unit number to the volume as the real mode volume driver which accesses the same logical volume.

13. The computer system of claim 12 wherein the means for the protected mode device driver assigning the same reference value comprises a drive table having an entry for each real mode volume driver, the entry containing a unique value stored on the logical volume accessed by the real mode volume driver and containing a volume unit number which has been previously assigned by the real mode volume driver, and means for the protected mode volume driver to assign the reference value contained in the entry to the logical volume which stores the unique value also contained in the entry.

14. The computer system of claim 9 wherein the device comprises an adapter to which one or more peripheral devices are attached, the real mode device driver is a real mode adapter driver which controls the adapter to access the peripheral devices in real mode and the protected mode device driver is a protected mode adapter driver which controls the adapters to access the peripheral devices in protected mode, and wherein the means for the protected mode adapter driver to assign the same reference value comprises the protected mode adapter driver assigning a same adapter number to the adapter as the real mode adapter driver which controls the same adapter to access the same peripherals.

15. The computer system of claim 14 wherein the means for the protected mode adapter driver assigning the same adapter number comprises a real mode data structure provided for each real mode adapter driver, the real mode data structure associating, for each peripheral attached to the adapter controlled by the real mode adapter driver for which the real mode data structure is provided, unique peripheral information scanned from the peripheral device connected to the adapter controlled by the real mode adapter driver with an adapter number which has been previously assigned by the real mode adapter driver, and means for the protected mode adapter driver to assign the adapter number associated with the unique peripheral information to the adapter that accesses the peripheral from which the unique peripheral information is scanned.

16. In a computer system connected to at least one system resource and capable of operating in a real mode and a protected mode, a method for a protected mode device driver to use a same identifier to access a system resource as an identifier used by a real mode device driver to access the same system resource, the method comprising the steps of:

storing the identifier for the system resource, associated with specific identifying information obtained from the system resource, in a data structure;

accessing the system resource by the protected mode device driver to obtain the specific identifying information;

obtaining the identifier for the system resource by the protected mode device driver from the data structure, the identifier associated with the specific identifying information obtained in the accessing step; and using the obtained identifier by the protected mode device driver to access the system resource.

17. In a computer system connected to at least one system resource and capable of operating in a real mode and a protected mode, a computer-readable storage device containing instructions for controlling a computer system to provide to a protected mode device driver a same identifier for accessing a system resource as an identifier used by a real mode device driver to access the same system resource, the instructions for controlling a computer system implementing the steps of:

storing the identifier for the system resource, associated with specific identifying information obtained from the system resource, in a data structure;

accessing the system resource by the protected mode device driver to obtain the specific identifying information;

obtaining the identifier for the system resource by the protected mode device driver from the data structure, the identifier associated with the specific identifying information obtained in the accessing step; and using the obtained identifier by the protected mode device driver to access the system resource.

18. In a computer having a connection to a device, a processor that can operate in real mode and protected mode, a real mode device driver for the device and a protected mode device driver for the device, a computer-readable medium holding computer-executable instructions for performing a method comprising the steps of:

(a) with the real mode device driver, assigning a unique reference value to the device that is accessed by the real mode device driver;

(b) accessing the device by the real mode device driver, to read device information which uniquely identifies the device;

(c) storing the reference value assigned to the device by the real mode device driver in a memory location associated with the device information read from the device;

(d) with the protected mode device driver, accessing the device to read the device information;

(e) retrieving the reference value that was stored in the memory location associated with the device information; and (f) with the protected mode device driver, assigning the reference value obtained in step (e) to the device accessed by protected mode device driver.

19. The computer-readable medium of claim 18 wherein step (c) comprises storing the reference value and the device information in a same entry in a data structure having an entry for each device connected to the computer.

20. In a computer having a connection to a disk, a processor that can operate in real mode and protected mode, a real mode disk driver for the disk and a protected mode disk driver for the disk, a computer-readable medium holding computer-executable instructions for performing a method comprising the steps of:

(a) with the real mode disk driver, assigning a unique drive unit number to the disk drive that is accessed by the real mode disk driver;

(b) accessing the disk drive by the real mode disk driver, to read disk information which uniquely identifies the disk residing on the disk drive;

(c) storing the drive unit number identifying the disk in a memory location associated with the disk information read from the disk;

(d) with the protected mode disk driver, accessing the disk drive to read the disk information from the disk residing on the disk drive;

(e) retrieving the drive unit number that was stored in the memory location associated with the disk information; and (f) with the protected mode disk driver assigning the drive unit number retrieved in step (e) to the disk drive accessed by the protected mode disk driver.

21. The computer-readable medium of claim 20 wherein the step of determining whether the stored status of the first device has changed comprises repeatedly determining whether the status contained in the status field in the first device entry has changed; and the step of updating the stored status of the second device comprises updating the status in the status field in the second device entry when the status in the status field in the first device entry changes.

22. In a computer system having a disk drive having a disk containing at least one logical volume, a processor that can operate in a real mode and a protected mode, a real mode volume driver for accessing the volume on the disk and a protected mode volume driver, a computer-readable medium holding computer-executable instructions for performing a method comprising the steps of:

(a) with the real mode volume driver, assigning a unique volume unit number to the volume accessed by the real mode volume driver;

(b) accessing the volume to read volume information which uniquely identifies the volume;

(c) storing the volume unit number assigned to the logical volume by the real mode volume driver in a memory location associated with the volume information read from the disk;

(d) with the protected mode volume driver, accessing the volume to read the volume information;

(e) retrieving the volume unit number stored in the memory location associated with the volume information read by the protected mode volume driver; and (f) with the protected mode volume driver, assigning the volume unit number obtained in step (e) to the disk accessed by the protected mode volume driver.

23. In a computer system having an adapter that is connected to a peripheral device, a processor that can operate in a real mode and protected mode, a protected mode adapter driver for controlling the adapter and a real mode adapter driver for controlling the adapter, a computer-readable medium holding computer-executable instructions for performing a method comprising the steps of:

(a) with the real mode adapter driver, assigning a unique adapter number to the real mode device driver;

(b) with the real mode adapter driver, scanning, from a peripheral device via the adapter, peripheral device information which uniquely identifies the peripheral device;

(c) storing the adapter number assigned to the adapter in a memory location associated with the peripheral device information read from the peripheral device;

(d) with the protected mode adapter driver, controlling the adapter to access the peripheral device to scan the peripheral device information;

(e) retrieving the adapter number stored in the memory location associated with the peripheral device information; and (f) with the protected mode adapter driver, assigning the adapter number obtained in step (e) to the adapter.

24. In a computer system having a protected mode functional driver and a corresponding real mode functional driver, a computer-readable medium holding computer-executable instructions for performing a method of determining whether to execute a protected mode functional driver instead of a real mode functional driver, the method comprising the computer-implemented steps of:

(a) designating the protected mode functional drivers as being executable instead of the corresponding real mode functional driver.

(b) detecting the real mode functional driver in the computer;

(c) determining whether the protected mode functional drivers have been designated as being executable instead of the detected real mode functional driver;

(d) executing the protected mode functional driver instead of the detected real mode functional driver when it is determined in step (b) that the protected mode functional driver has been designated as being executable instead of the real mode functional driver.

25. A computer-readable medium having computer executable instructions for assigning a unit number to a peripheral device accessed by a protected mode driver, the unit number having already been assigned to the peripheral device by a real mode driver, which when executed perform steps comprising:

(a) accessing the peripheral device with the real mode driver and the unit number to write a signature to the peripheral device, the signature uniquely identifying the peripheral device;

(b) storing the signature in a drive table;

(c) storing the unit number in the drive table such that the unit number is associated with the signature;

(d) with the protected mode driver, accessing the peripheral device to read the signature from the peripheral device;

(e) retrieving the unit number that was stored in the drive table associated with the signature; and (f) with the protected mode driver, assigning the unit number retrieved in step (e) to the peripheral device accessed by the protected mode driver in step (d) so that both the real mode driver and the protected mode driver identify the peripheral device with the unit number.

* * * * *